(12) United States Patent
Koseki et al.

(10) Patent No.: US 7,098,946 B1
(45) Date of Patent: Aug. 29, 2006

(54) IMAGE PICKUP APPARATUS

(75) Inventors: Hiroaki Koseki, Kokubunji (JP); Hidetoshi Fukuda, Yokohama (JP); Takumi Momose, Hachioji (JP); Minoru Kakinuma, Hachioji (JP); Osamu Inagaki, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/395,935

(22) Filed: Sep. 14, 1999

(30) Foreign Application Priority Data

Sep. 16, 1998 (JP) ................................. 10-279315

(51) Int. Cl.
*H04N 5/235* (2006.01)
*H04N 5/262* (2006.01)
*G03B 7/00* (2006.01)

(52) U.S. Cl. ................... 348/229.1; 348/239; 348/348; 348/362

(58) Field of Classification Search ............. 348/229.1, 348/333.04, 333.02, 231.1, 231.6, 208.15, 348/208.12, 231.3, 208.99, 239, 362
See application file for complete search history.

(56) References Cited

U.S. PATENT DOCUMENTS

| | | | | |
|---|---|---|---|---|
| 5,309,243 A | * | 5/1994 | Tsai | 348/229.1 |
| 5,486,861 A | | 1/1996 | Miyamoto et al. | 348/362 |
| 5,517,242 A | | 5/1996 | Yamada et al. | 348/254 |
| 5,801,773 A | | 9/1998 | Ikeda | 348/229 |
| 6,177,958 B1 | * | 1/2001 | Anderson | 348/362 |
| 6,204,881 B1 | * | 3/2001 | Ikeda et al. | 348/229.1 |
| 6,215,523 B1 | * | 4/2001 | Anderson | 348/333.05 |
| 6,539,177 B1 | * | 3/2003 | Parulski | 348/333.04 |
| 6,593,970 B1 | * | 7/2003 | Serizawa et al. | 348/362 |
| 2001/0000969 A1 | * | 5/2001 | Ohta et al. | 348/231 |
| 2003/0133035 A1 | * | 7/2003 | Hatano | 348/362 |

FOREIGN PATENT DOCUMENTS

| | | |
|---|---|---|
| EP | 0 713 342 | 5/1996 |
| EP | 0 713 342 A | 5/1996 |
| EP | 0 725 536 | 8/1996 |
| JP | 10-243288 | 9/1998 |

OTHER PUBLICATIONS

European Search Report dated Jun. 4, 2002.

* cited by examiner

*Primary Examiner*—David Ometz
*Assistant Examiner*—Kelly Jerabek
(74) *Attorney, Agent, or Firm*—Westerman, Hattori, Daniels & Adrian, LLP.

(57) ABSTRACT

An image pickup apparatus having function for synthesizing image signals corresponding to a plurality of frames of different exposure amounts to generate wide dynamic range, synthesized image is provided with: at least two control means among a taking control means based on a normal taking mode, a taking control means based on a forced wide dynamic range taking mode, and a taking control means based on an automatic wide dynamic range taking mode for selectively generating wide dynamic range, synthesized image automatically on the basis of object information or information set for the image taking; and means for selectively setting one image taking mode out of the taking modes respectively corresponding to the two control means. It is thereby possible to take image by selecting one image taking mode from at least two taking modes among the normal taking mode, the forced wide dynamic range taking mode, and the automatic wide dynamic range taking mode.

5 Claims, 23 Drawing Sheets

FIG. 7

53 — CORRECTING EXPOSURE RATIO
→ 1:9
RATIO BECOMING 1.125 TIMES

54 — NOT CORRECTING EXPOSURE AMT RATIO

```
1 : SL
2 : SL
3 : NOR
4 : SL
   .
   .
   .
```

```
MOTION:  N
BACK LT: Y
   .
   .
```

FIG. 21A

```
SETTING CHANGE MODE
CHANGING CAMERA SETTING
  Item 1    ORIG VALUE    NEW VALUE
  Item 2
  Item 3
     ·
     ·
     ·
     ·
```
(71)

FIG. 21B

```
RETAKING
AUTO
```
(72)

IMAGE PICKUP APPARATUS

BACKGROUND OF THE INVENTION

The present invention relates to image pickup apparatus having a function for obtaining a wide dynamic range, synthesized image by synthesizing image signals corresponding to a plurality of frames of different exposure amounts outputted from an image pickup device.

Solid-state image pickup devices such as CCD image pickup device are generally used in image pickup apparatus as TV camera, video camera, digital camera, etc. There is a problem however that the dynamic range of a solid-state image pickup device is much narrower than that of a silver halide photographic film.

To eliminate this problem, there have been proposed techniques in which image signals corresponding to two frames taken at different exposure amounts are read out from a single image pickup device and are synthesized to obtain an image having increased dynamic range. For example, an image pickup apparatus having the following construction is disclosed in Japanese Patent Publication No. 2522015. In particular, a disclosure has been made with respect to an image pickup apparatus including: image pickup means for converting object image into electrical signals; image pickup control means for selectively executing a first mode or second mode, said first mode for successively outputting images of different exposure amounts in cycles by cyclically changing charge accumulation time at the image pickup means, image portions at suitable level being synthesized to form a synthesized frame of said predetermined cycle by respectively comparing signal level of each portion of a plurality of frames of different exposure amounts outputted from said image pickup means with a predetermined reference value, said second mode for providing output by using a constant charge accumulation time at said image pickup means; and switch control means for switching the image pickup control means to the first mode when an occurrence of object having a large luminance difference within a frame is detected in said second mode by comparing signals obtained from said image pickup means in said second mode with a predetermined level. This image pickup apparatus, when in the first mode, is capable of obtaining an image of which all the portions of a frame are at suitable signal level. Even when object having a large luminance difference exists within a frame as in a backlighted condition, lack of detail at high level portion thereof for example does not occur within the frame and it is in effect possible to provide a wider dynamic range. Further, without an operator's decision on the conditions of object, etc., it is automatically switched to the first mode by the switch control means when object having a large luminance difference exists within a frame in the second mode, making it possible to automatically correct a backlighted condition, etc.

In the above described image pickup apparatus as disclosed in Japanese Patent Publication No. 2522015, however, switching to the first mode for generating wide dynamic range, synthesized image is automatically made when an existence of object having a large luminance difference is detected within a frame which is obtained in the second mode. No consideration has been made therein about a normal image taking mode where the generation of wide dynamic range, synthesized image is automatically prohibited or about a mode for forcing the generation of wide dynamic range, synthesized image. This results in a problem of a reduced operability. Further, there is another problem in the image pickup apparatus as disclosed in the abovementioned publication that, since means for displaying ON/OFF status of the generation processing of wide dynamic range, synthesized image are not provided, it is difficult to identify the switched state of ON/OFF of synthesized image.

SUMMARY OF THE INVENTION

It is a main object of the present invention to provide an image pickup apparatus in which image can be taken by selecting a mode from at least two modes among a normal taking mode, a forced wide dynamic range taking mode, and an automatic wide dynamic range taking mode.

In a first aspect of the invention, there is provided an image pickup apparatus including: image pickup means capable of taking images of the same object at a plurality of different exposure amounts to generate image signals corresponding to a plurality of frames of different exposure amounts; and means for generating wide dynamic range, synthesized image by synthesizing image signals corresponding to a plurality of frames of different exposure amounts obtained by the image pickup means. It further includes: at least two control means among a normal taking control means based on a normal taking mode for generating image pickup signals corresponding to one frame from the image pickup means, a forced wide dynamic range taking control means based on a forced wide dynamic range taking mode for forcing a generation of wide dynamic range, synthesized image, and an automatic wide dynamic range taking control means based on an automatic wide dynamic range taking mode for selectively generating wide dynamic range, synthesized image automatically on the basis of object information or information set for the image taking; and means for selectively setting one image taking mode out of the taking modes respectively corresponding to these control means.

By such construction, operability can be improved such that it is possible with a single image pickup apparatus to take image by selecting one taking mode from at least two modes among the normal taking mode, the forced wide dynamic range taking mode, and the automatic wide dynamic range taking mode. The above main object is thereby accomplished.

It is another object of the invention to provide an image pickup apparatus in which discrimination can be made as to whether or not it is suitable for the generation of synthesized image to take image on the basis of information based on previously taken image data, information obtained before the taking of image, or information set on the image pickup apparatus.

In a second aspect of the invention, there is provided an image pickup apparatus including: image pickup means capable of taking images of the same object at a plurality of different exposure amounts to generate image signals corresponding to a plurality of frames of different exposure amounts; and means for generating wide dynamic range, synthesized image by synthesizing image signals corresponding to a plurality of frames of different exposure amounts obtained by the image pickup means. It further includes means for displaying as a suitability determining information of the synthesized image generating process at least one information out of information based on previously taken image data, information obtained before the taking of image, and information set on the image pickup apparatus before the taking of image that is required in determining whether a suitable wide dynamic range, synthesized image can be obtained or not.

By thus displaying the suitability determining information, it is possible, in the case of manually setting the generation processing of synthesized image, to make discrimination as to whether or not a previously taken image data is an image data suitable for the generation of synthesized image by the displaying of information based on the previously taken image data; it is also possible by the displaying of an information obtained before the taking of image or information set before the taking of image to determine whether the generation of synthesized image based on such information is suitable or not. Further, in the case where the generation processing of synthesized image is automatically performed on the basis of the above described information, it is possible to confirm the information according to which the generation of synthesized image is made unsuitable. The above object is thereby accomplished.

It is still another object of the invention to provide an image pickup apparatus in which suitability for the generation processing of synthesized image can be quite readily confirmed.

In a third aspect of the invention, there is provided an image pickup apparatus including: image pickup means capable of taking images of the same object at a plurality of different exposure amounts to generate image signals corresponding to a plurality of frames of different exposure amounts; and means for generating wide dynamic range, synthesized image by synthesizing image signals corresponding to a plurality of frames of different exposure amounts obtained by the image pickup means. It further includes: means for determining the suitability to the generation processing of synthesized image of at least one information out of information based on previously taken image data, information obtained before the taking of image, and information set on the image pickup apparatus before the taking of image that is required in determining whether a wide dynamic range, synthesized image can be suitably generated or not; and display means for displaying the result of determination at the determination means.

By thus providing the means for displaying a determination result as to whether it is suitable for synthesized image generation processing or not, the suitability for the synthesized image generation processing can be quite readily confirmed. The above object is thereby accomplished.

It is yet another object of the invention to provide an image pickup apparatus in which the cause for unsuitableness of synthesized image can be confirmed so that the image taking conditions be changed to achieve suitable conditions.

In a fourth aspect of the invention, the display means of the image pickup apparatus according to the third aspect displays information determined as unsuitable as N.G. information when it is determined as unsuitable by the determination means.

Since information becoming unsuitable is thus displayed as N.G. information, the cause of unsuitableness can be confirmed and it is thereby possible to achieve suitable conditions by changing the image taking conditions. The above object is thereby accomplished.

It is a further object of the invention to provide an image pickup apparatus in which it is possible to confirm the level of change in the image taking conditions for achieving suitableness.

In a fifth aspect of the invention, the display means of the image pickup apparatus according to the third or fourth aspect displays the result of determination at the determination means as a numerical parameter of information and at the same time displays a suitable range for synthesizing process of the information numeric parameter.

By thus displaying a suitable range of synthesizing process together with a numeric parameter of information, it is possible to confirm the level of change in the image taking conditions for achieving suitableness. The above object is thereby accomplished.

It is a further object of the invention to provide an image pickup apparatus capable of preventing an unsuitable taking of image resulting in a degraded picture quality, etc., from being executed.

In a sixth aspect of the invention, there is provided an image pickup apparatus including: image pickup means capable of taking images of the same object at a plurality of different exposure amounts to generate image signals corresponding to a plurality of frames of different exposure amounts; and means for generating wide dynamic range, synthesized image by synthesizing image signals corresponding to a plurality of frames of different exposure amounts obtained by the image pickup means. It further includes: at least two control means among a normal taking control means based on a normal taking mode for generating image pickup signals corresponding to one frame from the image pickup means, a forced wide dynamic range taking control means based on a forced wide dynamic range taking mode for forcing a generation of wide dynamic range, synthesized image, and an automatic wide dynamic range taking control means based on an automatic wide dynamic range taking mode for selectively generating wide dynamic range, synthesized image automatically on the basis of object information or information set for the image taking; means for selectively setting one image taking mode out of the taking modes respectively corresponding to these control means; a suitability determination means for determining whether or not information obtained as the conditions of generation processing for the generation of wide dynamic range, synthesized image is the information suitable for the generation processing of wide dynamic range, synthesized image; and display means for displaying "inconsistency" when the taking mode set at the mode setting means and the result of determination made at the suitability determination means are not suitable to each other.

By thus displaying "inconsistency" when the set taking mode and the result of determination at the suitability determination means are not suitable to each other, it is possible to prevent an unsuitable taking of image resulting in a degraded picture quality, etc., from being executed. The above object is thereby accomplished.

It is a further object of the present invention to provide an image pickup apparatus in which the difference in exposure conditions of a plurality of images to be taken and the dynamic range if they are combined into a synthesized image can be recognized.

In a seventh aspect of the invention, there is provided an image pickup apparatus including: image pickup means capable of taking images of the same object at a plurality of different exposure amounts to generate image signals corresponding to a plurality of frames of different exposure amounts; and means for generating wide dynamic range, synthesized image by synthesizing image signals corresponding to a plurality of frames of different exposure amounts obtained by the image pickup means. It further includes means for displaying an exposure amount ratio of the image signals corresponding to a plurality of frames of different exposure amounts.

By thus displaying an exposure amount ratio of the image signals corresponding to a plurality of frames of different exposure amounts, it is possible to recognize the difference in exposure conditions of the plurality of images to be taken and the dynamic range if they are combined into a synthesized image. The above object is thereby accomplished.

It is a further object of the present invention to provide an image pickup apparatus in which confirmation can be made as to an occurrence of correction of exposure amount ratio and at the same time shift in the exposure amount ratio and the dynamic range based on the corrected exposure amount ratio can be confirmed.

In an eighth aspect of the invention, there is provided an image pickup apparatus including: image pickup means capable of taking images of the same object at a plurality of different exposure amounts to generate image signals corresponding to a plurality of frames of different exposure amounts; and means for generating wide dynamic range, synthesized image by synthesizing image signals corresponding to a plurality of frames of different exposure amounts obtained by the image pickup means. It further includes: means for correcting exposure amount of the image signals corresponding to a plurality of frames of different exposure amounts; and display means for displaying operation status of the means for correcting exposure amount.

By thus providing the means for displaying operation status of the correction means of exposure amount ratio, confirmation can be made as to an occurrence of correction of exposure amount ratio. And at the same time, by displaying the exposure amount ratio before and after the correction, it is possible to confirm shift in the exposure amount ratio, the dynamic range based on the corrected exposure amount ratio, etc. The above object is thereby accomplished.

It is a further object of the invention to provide an image pickup apparatus in which confirmation can be made as to an occurrence of correction of motion and a resulting degradation in image quality can be easily noticed.

In a ninth aspect of the invention, there is provided an image pickup apparatus including: image pickup means capable of taking images of the same object at a plurality of different exposure amounts to generate image signals corresponding to a plurality of frames of different exposure amounts; and means for generating wide dynamic range, synthesized image by synthesizing image signals corresponding to a plurality of frames of different exposure amounts obtained by the image pickup means. It further includes: means for detecting motion of an object image; means for correcting amount of motion when the motion amount detected at the motion detection means is within an allowable range for correction; and display means for displaying operation status of the motion amount correction means.

By thus providing the means for displaying operation status of the motion correction means, an occurrence of correction of motion can be confirmed. Further, since the fact of the occurrence of motion can be seen from the displaying of "Motion Correction", the resulting degradation in image quality can be easily noticed. The above object is thereby accomplished.

It is a further object of the present invention to provide an image pickup apparatus in which confirmation can be readily made whether a synthesizing process will be actually performed or whether it has been performed.

In a tenth aspect of the invention, there is provided an image pickup apparatus including: image pickup means capable of taking images of the same object at a plurality of different exposure amounts to generate image signals corresponding to a plurality of frames of different exposure amounts; and means for generating wide dynamic range, synthesized image by synthesizing image signals corresponding to a plurality of frames of different exposure amounts obtained by the image pickup means. It further includes: at least two control means among a normal taking control means based on a normal taking mode for generating image pickup signals corresponding to one frame from the image pickup means, a forced wide dynamic range taking control means based on a forced wide dynamic range taking mode for forcing a generation of wide dynamic range, synthesized image, and an automatic wide dynamic range taking control means based on an automatic wide dynamic range taking mode for selectively generating wide dynamic range, synthesized image automatically on the basis of object information or information set for the image taking; means for selectively setting one image taking mode out of the taking modes respectively corresponding to these control means; and display means for displaying ON/OFF status of the generation processing of wide dynamic range, synthesized image on the basis of the taking mode set at the mode setting means.

By thus providing the display means for displaying ON/OFF status of the generation processing of wide dynamic range, synthesized image, it is possible to readily confirm whether a synthesizing process will be actually performed or whether it has been actually performed. The above object is thereby accomplished.

It is a further object of the present invention to provide an image pickup apparatus in which it is possible to confirm an actual synthesized image.

In an eleventh aspect of the invention, there is provided an image pickup apparatus including: image pickup means capable of taking images of the same object at a plurality of different exposure amounts to generate image signals corresponding to a plurality of frames of different exposure amounts; and means for generating wide dynamic range, synthesized image by synthesizing image signals corresponding to a plurality of frames of different exposure amounts obtained by the image pickup means. It further includes display means for displaying synthesized image outputted from the means for generating wide dynamic range, synthesized image.

By thus displaying wide dynamic range, synthesized image, it is possible to confirm an actual synthesized image. The above object is thereby accomplished.

It is a further object of the invention to provide an image pickup apparatus capable of taking image with improving image quality.

In a twelfth aspect of the invention, there is provided an image pickup apparatus including: image pickup means capable of taking images of the same object at a plurality of different exposure amounts to generate image signals corresponding to a plurality of frames of different exposure amounts; and means for generating wide dynamic range, synthesized image by synthesizing image signals corresponding to a plurality of frames of different exposure amounts obtained by the image pickup means. It further includes: at least two control means among a normal taking control means based on a normal taking mode for generating image pickup signals corresponding to one frame from the image pickup means, a forced wide dynamic range taking control means based on a forced wide dynamic range taking mode for forcing a generation of wide dynamic range, synthesized image, and an automatic wide dynamic range taking control means based on an automatic wide dynamic range taking mode for selectively generating wide dynamic range, synthesized image automatically on the basis of object information or information set for the image taking; means for selectively setting one image taking mode out of the taking modes respectively corresponding to these control means; a suitability determination means for determining whether information obtained as the conditions of generation processing for the generating wide dynamic range, synthesized image is the information suitable for the generation processing of wide dynamic range, synthesized image; and means for directing a change in the setting of parameter of the information or in the setting of taking mode or directing a retake when the taking mode set at the mode setting means and the result of determination made at the suitability determination means are not suitable to each other.

When the taking mode and the content of information parameter are unsuitable to each other, if before the taking of image, the means for directing a change in the setting of taking mode or information parameter is provided so that image can be taken with improving image quality. Further, if after the taking of image, since a retake is directed, it is similarly possible to take image with improving image quality. The above object is thereby accomplished.

It is a further object of the present invention to provide an image pickup apparatus in which dynamic range and/or suitable exposure amount can be recognized by numeric values.

In a thirteenth aspect of the invention, there is provided an image pickup apparatus including: image pickup means capable of taking images of the same object at a plurality of different exposure amounts to generate image signals corresponding to a plurality of frames of different exposure amounts; and means for generating wide dynamic range, synthesized image by synthesizing image signals corresponding to a plurality of frames of different exposure amounts obtained by the image pickup means. It further includes means for displaying brightness information of a desired portion of object together with an image of the object.

By thus providing the means for displaying brightness information of a desired portion of object together with an object image, the displaying of luminance of the darkest portion and the brightest portion of the object for example makes it possible to recognize dynamic range and/or suitable exposure amount by numeric values. The above object is thereby accomplished.

It is a further object of the present invention to provide an image pickup apparatus in which dynamic range of synthesized image can be set at will by a visual method.

In a fourteenth aspect of the invention, there is provided an image pickup apparatus including: image pickup means capable of taking images of the same object at a plurality of different exposure amounts to generate image signals corresponding to a plurality of frames of different exposure amounts; and means for generating wide dynamic range, synthesized image by synthesizing image signals corresponding to a plurality of frames of different exposure amounts obtained by the image pickup means. It further includes: means for designating a plurality of desired regions of a displayed image; means for obtaining luminance information of the regions designated by the designating means; and means for adjusting exposure amounts of the plurality of images such that suitable luminance levels are achieved of the respectively obtained luminance information at the time of generating a wide dynamic range, synthesized image.

Since exposure amounts of the plurality of images are thus adjusted so that luminance information of the designated, desired regions is of suitable luminance levels at the time of generating wide dynamic range, synthesized image, it becomes possible to set wide dynamic range of the synthesized image at will by a visual method. The above object is thereby accomplished.

It is a further object of the present invention to provide an image pickup apparatus in which object regions wished to be included in the wide dynamic range of synthesized image can be readily designated.

In a fifteenth aspect of the invention, the means for designating a plurality of desired regions of image of the image pickup apparatus according to the fourteenth aspect includes means for marking by setting and locking a previously set, framed narrow region on a target object in the image.

By constructing the designation means in this manner, the object regions wished to be included within the dynamic range of synthesized image can be readily designated. The above object is thereby accomplished.

It is a further object of the invention to provide an image pickup apparatus in which dynamic range of synthesized image can be set at will by a visual method.

In a sixteenth aspect of the invention, there is provided an image pickup apparatus including: image pickup means capable of taking images of the same object at a plurality of different exposure amounts to generate image signals corresponding to a plurality of frames of different exposure amounts; and means for generating wide dynamic range, synthesized image by synthesizing image signals corresponding to a plurality of frames of different exposure amounts obtained by the image pickup means. It further includes: display means for respectively displaying a plurality of images of different exposure amounts; and means for setting the exposure amounts of the images displayed by the display means to desired exposure amounts, the dynamic range of synthesized image being set on the basis of the exposure amounts respectively set for the plurality of images.

Since the exposure amounts of the plurality of displayed images are thus set to desired exposure amounts and the dynamic range of synthesized image is set on the basis of the set exposure amounts, it becomes possible to set the dynamic-range of synthesized image at will by a visual method. The above object is thereby accomplished.

It is a further object of the invention to provide AE apparatus of image pickup apparatus in which time-lag in shutter and dissipation power can be reduced.

In a seventeenth aspect of the invention, there is provided an AE device in image pickup apparatus including: means for controlling exposure amount to an image pickup device; control means for setting a plurality of different exposure amounts to the means for controlling exposure amount; means for acquiring a plurality of output information based on the plurality of exposure amounts set from the image pickup device; means for generating synthesized output information of wide dynamic range by synthesizing the plurality of acquired output information; and means for deciding exposure amounts from the synthesized output information.

By such configuration of AE device, suitable values of exposure can be decided in a short time period on the basis of the plurality of output information of different exposure amounts and it is possible to solve the problem of time-lag in shutter and/or dissipation power. The above object is thereby accomplished.

BRIEF DESCRIPTION OF THE DRAWING

FIG. 7 shows a manner of displaying the suitability determining information obtained in connection with a wide dynamic range image taking.

FIG. 21A and FIG. 21B show a manner of displaying when changing the setting of information parameters or retaking image.

DESCRIPTION OF THE PREFERRED EMBODIMENTS

Figure 1:
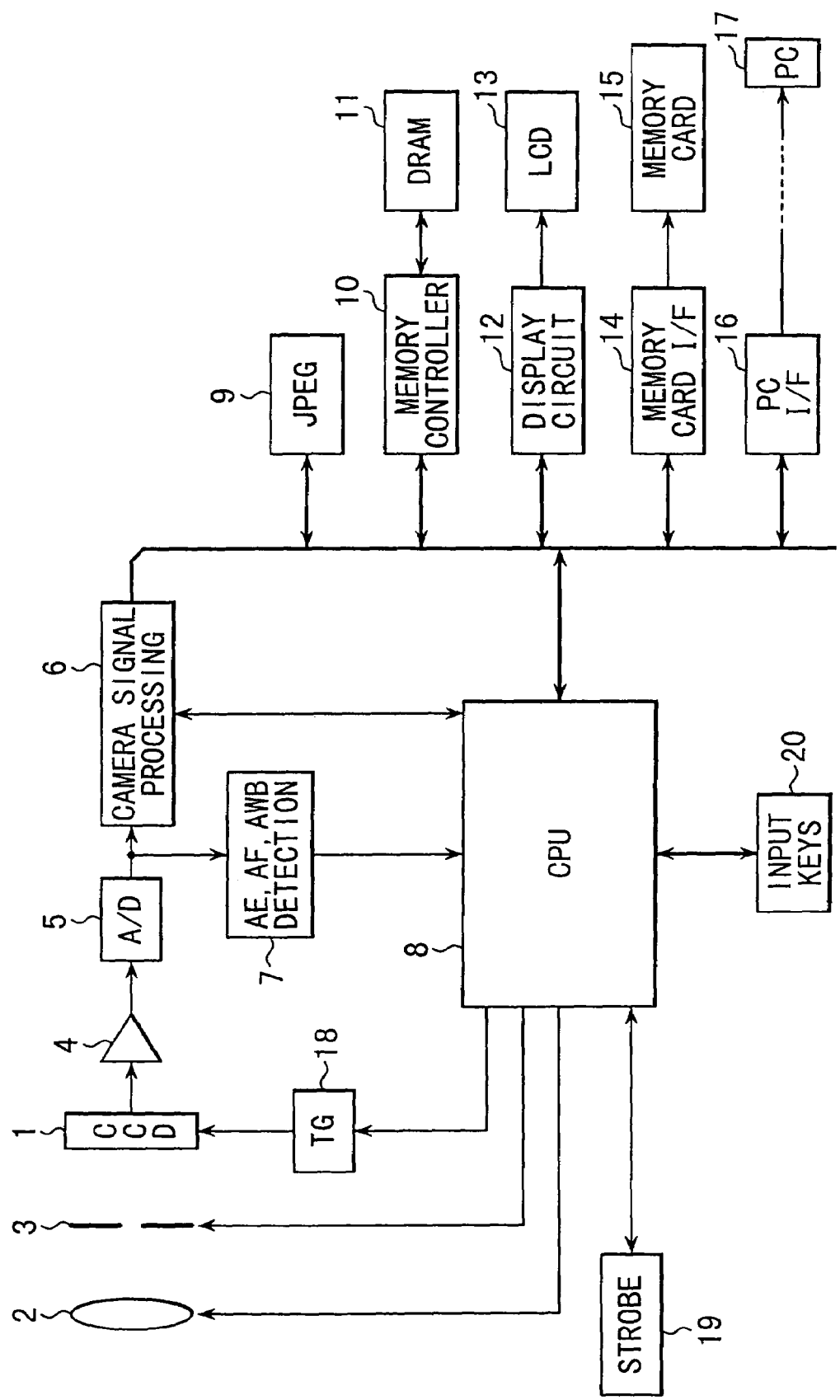
FIG. 1 is a block diagram showing an overall, electrical construction of a digital camera, being an embodiment of image pickup apparatus according to the present invention.

Some embodiments of the present invention will now be described. First, a description will be given below by way of a block diagram shown in FIG. 1 with respect to an overall, electrical construction of a digital camera which is a first embodiment of the image pickup apparatus according to the invention. Referring to FIG. 1, denoted by numeral 1 is a single-plate color CCD image pickup device for photoelectrically converting an optical signal into an electrical signal. It includes an electronic shutter function. An object light is inputted to CCD image pickup device 1 through a lens 2 and a stop/shutter mechanism 3. An output of CCD image pickup device 1 is amplified at an amplifier 4 after removed of noise for example at a correlation double sampling circuit. An analog-to-digital converter 5 converts the output of the amplifier 4 outputted as analog data into digital data. A camera signal processing circuit 6 processes signals from CCD image pickup device 1 as an image data. Those denoted by numeral 7 include an AF detection circuit for extracting AF (autofocus) information to control focus, an AE detection circuit for extracting AE (auto exposure) information to control exposure, and an AWB detection circuit for extracting AWB (auto white balance) information to set white balance, by using such as the image pickup signals from the CCD image pickup device 1 before the main taking of image. Output signals from the AF, AE, AWB detection circuit 7 provide through CPU 8 AF information to lens 2, AE information to stop/shutter mechanism 3, and AWB information to the camera signal processing circuit 6.

Numeral 9 denotes a compression circuit (JPEG) for compressing data volume. The image data compressed at the compression circuit 9 is recorded at memory card 15 through memory card I/F 14. Memory controller 10 and DRAM 11 are used as working memory when performing color processing of image data, etc. A display circuit 12 and LCD display unit 13 are used for example to confirm the image taking conditions by reading out and displaying data recorded at the memory card 15. Denoted by numeral 16 is a personal computer I/F for transmitting data recorded on the memory card 15 to a personal computer 17. It should be noted that, in FIG. 1, numeral 18 denotes a timing generator which generates timing pulse for driving the CCD image pickup device 1. It drives the CCD image pickup device 1 in accordance with control of CPU 8. A strobe mechanism 19 is controlled through CPU 8 by AE information which is to be obtained before the main taking of image. It effects control as to whether strobe should be emitted or not and controls the quantity of light of the strobe emission. Numeral 20 denotes input keys of CPU through which one is able to effect setting of various types of image taking modes and image taking conditions, driving of various switches, etc.

Figure 2:
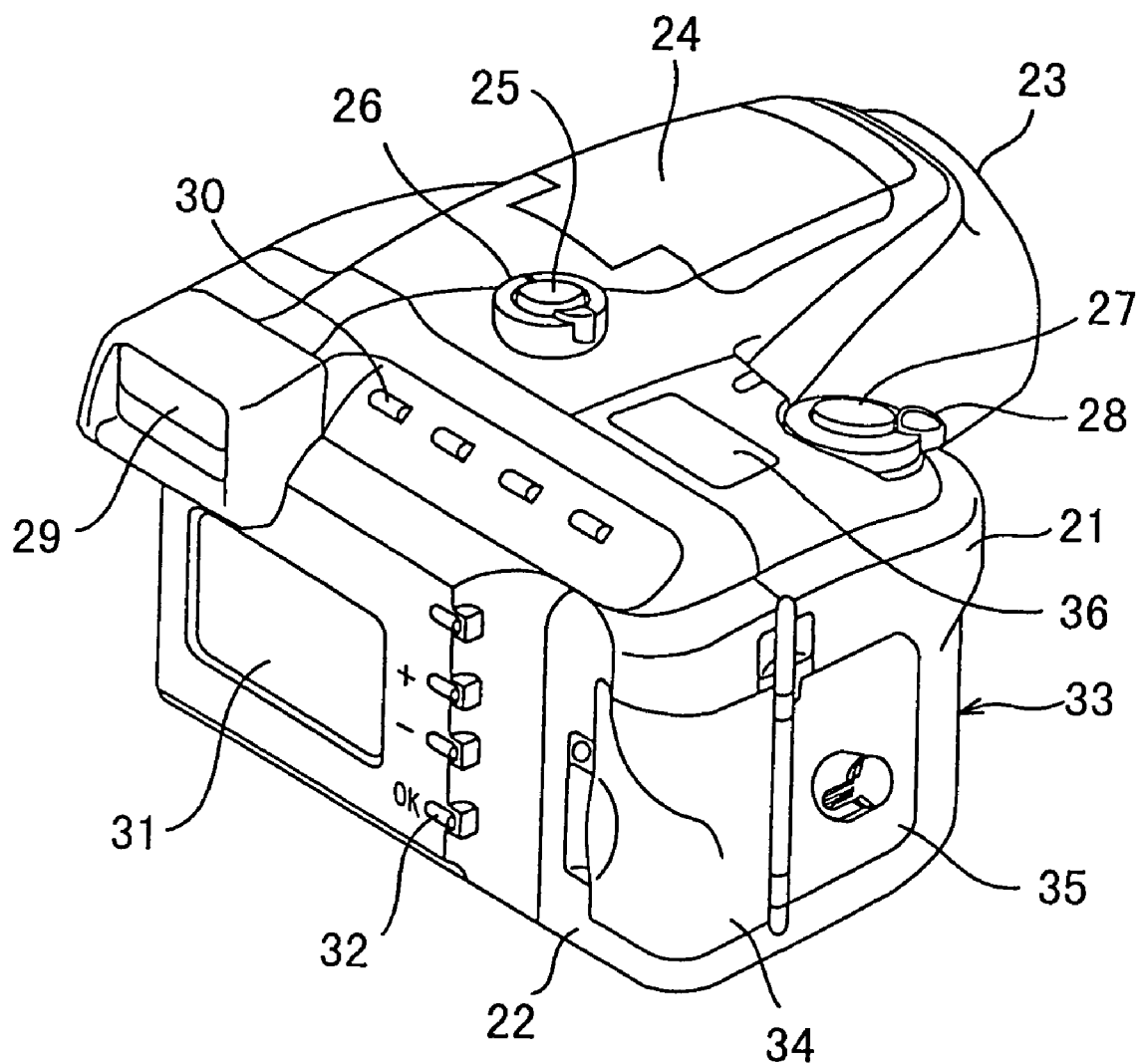
FIG. 2 shows an external construction of the embodiment shown in FIG. 1.

An external construction of the digital camera according to the present embodiment will now be described by way of an outside drawing as viewed from the photographer's side as shown in FIG. 2. In this embodiment, the apparatus body is constituted by two exterior members, a front cover 21 and a rear cover 22. A taking lens 23 on a front surface and a turn type strobe 24 on an upper surface are respectively provided on the front cover 21. The strobe 24 in FIG. 2 is shown in its unused state. Further, a power switch button 25 for turning ON/OFF a power supply of the apparatus is provided on the upper surface of the front cover 21. Upon depression of the power switch button 25, an internally located power switch is operated and, corresponding to this, CPU 8 controls ON/OFF of the power supply.

Provided on the circumference of the power switch button 25 is a ring-like R/P changeover switch button 26 which is turned to be operated. The R/P changeover switch button 26 is to switch between recording and playback. By turning it about the power switch button 25 to operate an internally located R/P switch, switching of recording/playback modes is controlled. Further, a release button 27 is provided toward the right end on the upper surface of the front cover 21. By pressing down the release button 27 at the time of recording, a release switch at the inside is turned ON so that object image is recorded to the memory card 15. A zoom knob 28 is provided on the circumference of the release button 27, the zoom knob 28 being so constructed as to turn about the release button 27. When the zoom knob 28 is turned clockwise or counterclockwise, a zoom focus mechanism at the inside of the taking lens 23 is controlled in linkage with a zoom switch in accordance with previously set directions so that image to be taken is enlarged/reduced.

An ocular section 29 of the optical finder for confirming image to be taken is disposed at an upper left end portion of the rear cover 22. Four mode setting buttons 30 are disposed side by side along an upper surface slope of the rear cover 22 toward the right of the finder ocular section 29. The mode setting buttons 30 are used in setting image taking mode, ON/OFF of strobe, forced emission, compression factor or shutter speed at the time of recording, etc., and are respectively provided with internally located, corresponding mode switches. An image LCD display section (color liquid crystal display section) 31 is disposed on the back of the rear cover below the finder ocular section 29. A recorded object image or the like is displayed on the image LCD display section 31 and it is used to confirm previously taken images, etc. Further, ON/OFF of displaying is possible on the image LCD display section 31 of such non-image, incidental information at the time of image recording as image taking modes, various image taking conditions, and in addition recording date and time, frame number, etc. Four menu setting buttons 32 are arranged in a vertical direction on the right side of the image LCD display section 31, these buttons from the top to the bottom being a "menu" button, "+" button, "−" button, and "OK" button. It should be noted that the above described power switch button 25, R/P changeover switch button 26, release button 27, mode setting buttons 30, menu setting buttons 32, etc., correspond to the input keys 20 as shown in FIG. 1.

Referring to FIG. 2, a right side portion of the digital camera according to this embodiment constitutes a holding part 33 corresponding to the so-called grip, for holding it by the right hand when taking image. A lid 34 for memory card is disposed at a corner on the photographer's side of the holding part 33 and a lid 35 for battery is disposed adjacent to the memory card lid 34. Further, an LCD 36 for displaying various information is disposed in the vicinity of the release button 27 on the upper surface of the front cover 21.

Recording operation of the image pickup apparatus having the above described construction will now be described. First, the power switch button 25 is pressed down to introduce power and recording mode is set by the R/P changeover switch button 26. An image taking mode is then set by the mode setting buttons 30. In the present embodiment, those which can be selected and set by the input keys 20, i.e., mode setting buttons 30 as image taking mode are: a normal image taking mode for obtaining image pickup signals corresponding to one frame by one taking of image based on normal AE information; an automatic wide dynamic range image taking mode for automatically performing ON/OFF control of wide dinamic range (hereinafter referred to as: SL (Super Latitude)) image taking for obtaining SL synthesized image on the basis of image information corresponding to previously taken two frames, various information obtained before the taking of image, information set on the camera before the taking of image, etc., in which image signals corresponding to two frames of different exposure amounts are generated and synthesized by taking image of the same object twice at different exposure amounts; and a forced SL image taking mode for forcing the above described SL image taking. Based on the inputting and setting of such modes, an image taking mode is switched to another by CPU 8.

If the apparatus is set to the normal taking mode where SL image taking is not to be performed, image pickup signals obtained by one taking of image on the basis of a normal AE information are converted into digital signal at the analog-to-digital converter 5, subjected to a predetermined signal processing at the camera signal processing circuit 6, and then compressed at the compression circuit 9 to be recorded to the memory card 15.

Figure 3:
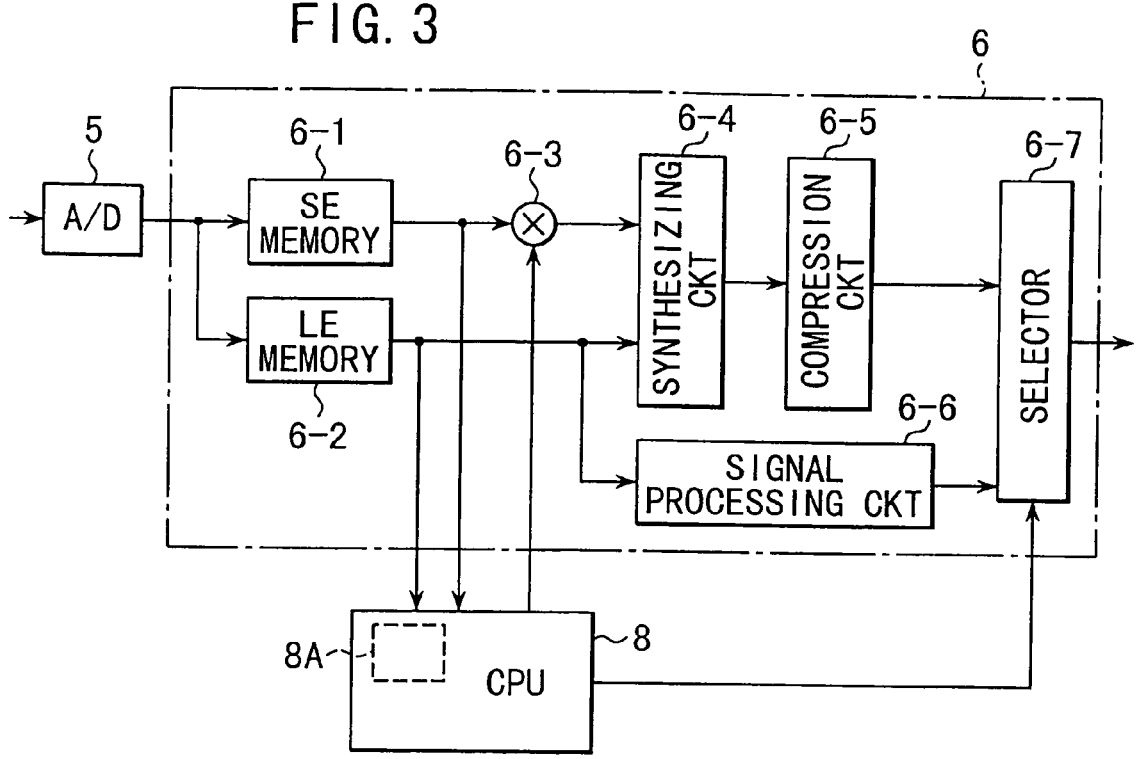
FIG. 3 is a block diagram showing an example of construction of the camera signal processing circuit in the embodiment shown in FIG. 1.

When the apparatus is set to the automatic SL taking mode, on the other hand, if ON/OFF of the generation processing of SL synthesized image is to be automatically performed on the basis of information, such as motion of the object, obtained from previously taken image signals corresponding to two frames of different exposure amounts, the generation processing of automatic SL synthesized image is performed by using a camera signal processing circuit constructed as shown in FIG. 3.

Included in FIG. 3 are: 6-1, SE memory for storing short-time exposure image data; 6-2, LE memory for storing long-time exposure image data; 6-3, a multiplier for multiplying a short-time exposure image data read out from the SE memory 6-1 by an exposure amount ratio A(=LE/SE) of the short-time exposure image and long-time exposure image; 6-4, a synthesizing circuit for forming by means of synthesis a wide dynamic range, synthesized image from the short-time exposure image data after the multiplication and the long-time exposure image data read out from the LE memory 6-2; 6-5, a compression circuit for compressing the SL synthesized image obtained at the synthesizing circuit 6-4; 6-6, a signal processing circuit for subjecting the long-time exposure image data read out from the LE memory 6-2 to such processing as γ-correction and edge enhancement; and 6-7, a selector for providing an output by switching based on control signal from CPU 8 between the SL synthesized image from the synthesizing circuit 6-4 and the long-time exposure image data having been subjected to signal processing at the signal processing circuit 6-6. Further, denoted by numeral 8A is a motion detecting section provided internally of CPU 8, for detecting motion in the object based on the short-time exposure image data and long-time exposure image data read out from the SE memory 6-1 and LE memory 6-2. Switching of the selector 6-7 is controlled on the basis of the output of the motion detecting section 8A.

A description will now be given with respect to an operation of thus constructed camera signal processing circuit 6. First, a short-time exposure image data and a long-time exposure image data of the same object taken at CCD image pickup device 1 are temporarily stored to SE memory 6-1 and LE memory 6-2. The image data are then transmitted to CPU 8 from the two memories 6-1, 6-2 to detect motion, of the object at the motion detecting section 8A on the basis of the two image data of different exposure amounts. When no motion is detected at the motion detecting section 8A, a wide dynamic range, synthesized image synthesized at the synthesizing circuit 6-4 on the basis of the image data read out from the two memories 6-1, 6-2 and compressed at the compression circuit 6-5 is outputted through the selector 6-7 which is controlled by CPU 8. On the other hand, if a motion is detected, the output of synthesized image is turned OFF and the long-time exposure image data read out from the LE memory 6-2 and subjected to signal processing at the signal processing circuit 6-6 is outputted through the selector 6-7. A motion is thus detected on the basis of previously taken image data so that it is possible to prevent a failed, synthesized image from being outputted when the object has been moved at the time of taking two images at different exposure amounts.

Figure 4:
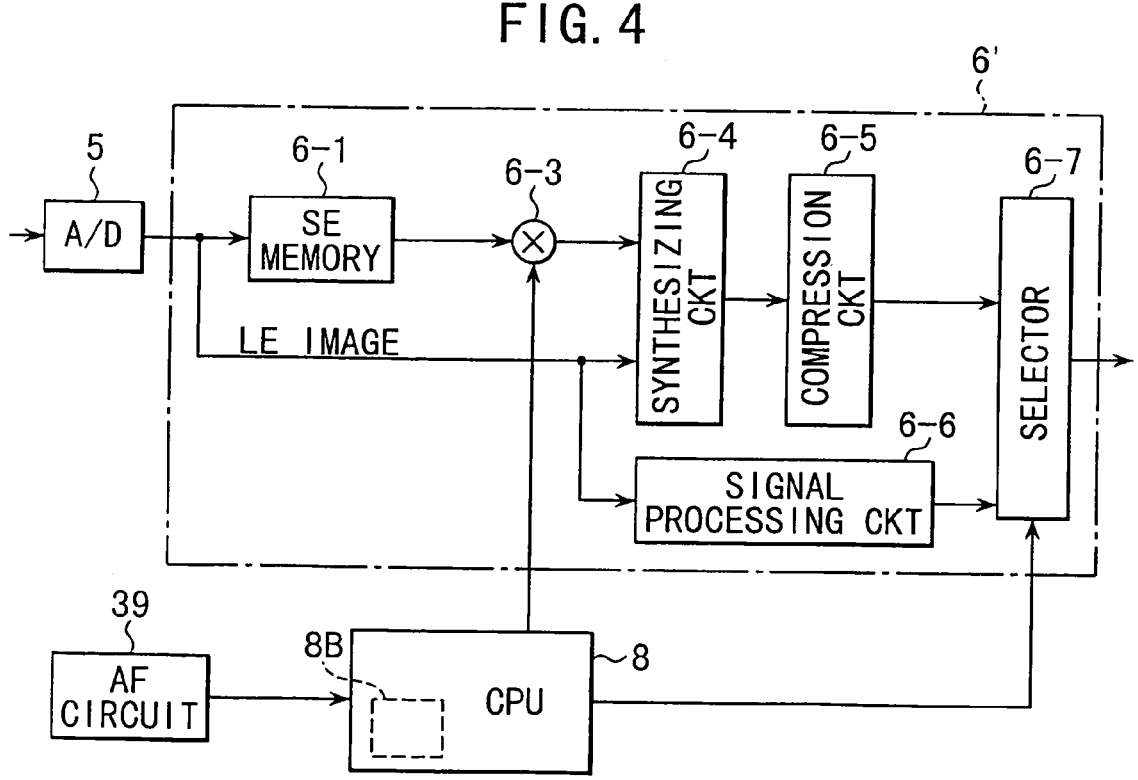
FIG. 4 is a block diagram showing another example of construction of the camera signal processing circuit.

Further, if ON/OFF of the generation processing of SL synthesized image is to be automatically switched by detecting a motion of the object on the basis of information obtained before the taking of image, such as AF signal from an external AF circuit by providing the external AF circuit, the generation processing of automatic SL synthesized image is performed by using a camera signal processing circuit constructed as shown in FIG. 4.

In this case, as shown in FIG. 4, only the frame memory 6-1 for storing short-time exposure image data is included as frame memory in the camera signal processing circuit 6'. The short-time exposure image data is taken into SE memory 6-1. The short-time exposure image data is read out from SE memory 6-1 in accordance with timing of the long-time exposure image data. After multiplication processing performed based on an exposure amount ratio, synthesizing process is performed at the synthesizing circuit 6-4 and compression processing is performed at the compression circuit 6-5. Here, motion of the object is detected at a motion detecting section 8B provided internally of CPU on the basis of AF signal from an external AF circuit 39. If no motion is detected, the selector 6-7 is previously switched at the camera signal processing circuit 6' so as to output a wide dynamic range, synthesized image which has been synthesized and compressed. On the other hand, if a motion is detected, the selector 6-7 is previously switched so as to output a long-time exposure image data which is taken based on a second AF information, thereby preventing a synthesized image failed due to motion from being outputted.

If the apparatus is set to the forced SL taking mode, a camera signal processing circuit for example as shown in FIG. 3 is used. The forced SL taking mode is executed by effecting control at CPU 8 so that SL synthesized image be always outputted from the selector 6-7.

Figure 5A:
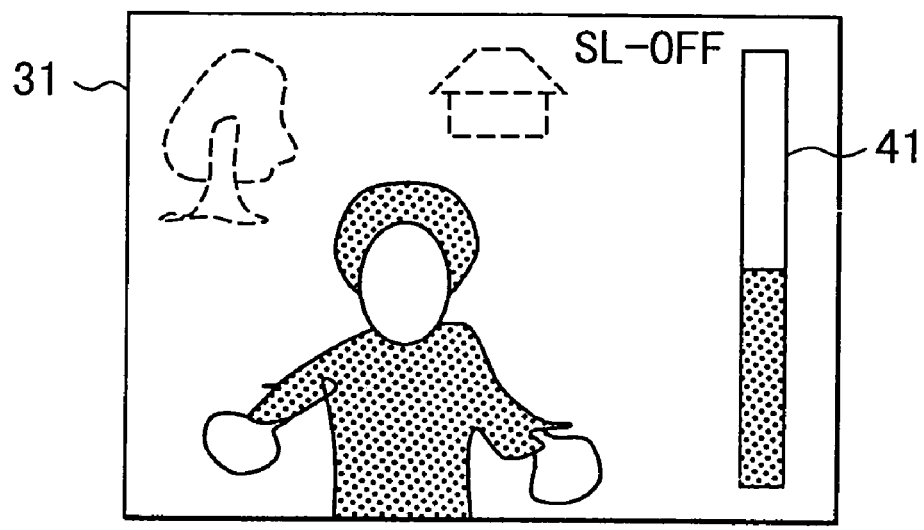
FIGS. 5A and 5B show a manner of displaying at LCD display section when setting the respective taking modes.
Figure 5B:
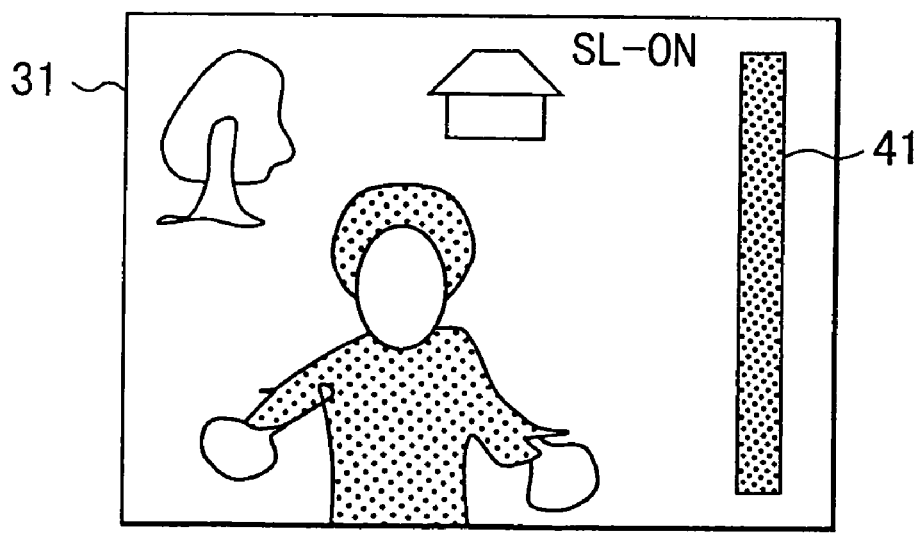

Further, in this embodiment, when the above described respective taking modes are selectively set, an indication of the set taking mode is displayed together with an image by each taking mode on the LCD display section 31 (13), etc. In particular, when the recording mode has been set by the R/P changeover switch button 26, an indication of the previous (directly previous) taking mode is displayed on the taking mode display section. When a taking mode is set anew by the mode setting buttons 30, an indication of the newly set taking mode is displayed. In a manner of displaying image taking modes on the LCD display section 31: "SL-OFF" is displayed as shown in FIG. 5A when set to the normal taking mode where SL taking is not to be performed; "SL-ON" is displayed as shown in FIG. 5B when set to the forced SL taking mode; "SL-AUTO" is displayed when set to the automatic SL taking mode. Further, since the case of executing SL taking and the case of executing a normal taking without executing SL taking are included when set to the automatic SL taking mode, it is preferable to display these for example as "SL-AUTO-ON", "SL-AUTO-OFF". Furthermore, in FIGS. 5A and 5B, numeral 41 denotes dynamic range (D range) represented by a bar graph, indicating that it in the case of forced SL taking mode (SL-ON) is twice as great as in the case of the normal taking mode (SL-OFF). It should be noted that the indication of the respective taking mode on the image in each taking mode can be switched ON/OFF for its displaying or erasing.

Figure 6A:
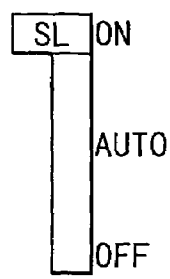
FIGS. 6A to 6C show an example of construction of switch for setting image taking mode.
Figure 6B:
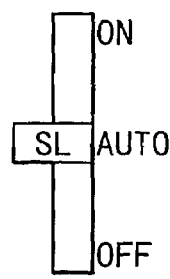
Figure 6C:
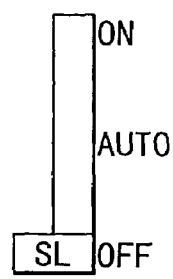

While the above described embodiment has been shown as that in which each of the above described taking modes is set by the mode setting buttons 30, each taking mode can also be set by providing a ternary slide-type switch as one of the input keys for example as shown in FIG. 6. It is shown as set to the forced SL taking mode in FIG. 6A, to the automatic SL taking mode in FIG. 6B, and to the normal taking mode in FIG. 6C.

Further, the above embodiment has been shown as that in which the apparatus can be set to the three image taking modes, i.e., normal taking mode, automatic SL taking mode, and forced SL taking modes. However, the setting can also be a combination of the normal taking mode and automatic SL taking mode, of the automatic SL taking mode and forced SL taking mode, or of the normal taking mode and forced SL taking mode.

Furthermore, the selected state can be also made known by representing one of the plurality of modes such as the normal taking mode (SL-OFF) without displaying its indication while displaying indication of the other modes for example as "SL-ON" or "SL-AUTO".

A second embodiment will now be described. The present invention premises an image pickup apparatus having SL image taking function. In performing SL taking, the suitability for SL taking is automatically determined or is manually determined on the basis of various information related to the SL taking so as to decide on ON/OFF switching of SL taking. In the second embodiment, such information related to SL taking is displayed on the LCD display section. By thus displaying the respective degree or extent of each information related to SL taking on the display section as an information parameter, it is possible in the case of the automatic SL taking mode to recognize how ON/OFF switching of SL taking has been made based on what state of the various types of information, and in the case of manually setting SL taking to suitably perform ON/OFF switching of SL taking on the basis of information related to SL taking.

In respect of SL taking, the types of information for determining its suitability are as follows. First, among the information related SL taking based on previously taken image data is information on motion of the object as previously described in the first embodiment. Since a presence of motion in the object results in a failure of SL synthesized image, it is an important information in switching ON/OFF of the SL synthesized image. Accordingly, an occurrence or non-occurrence of motion is displayed as information for determining the suitability of SL taking. Further, in respect of motion of the object, since correction is possible if the amount of motion is within an allowable range for correction, the amount of motion is displayed in addition to the occurrence or non-occurrence of motion as a determination making information. By thus obtaining information for switching ON/OFF of SL taking from previously taken image data, an accurate determination making information can be obtained.

Among the types of information obtained before the taking of image for determining the suitability related to SL taking are: information on motion of the object obtained on the basis of AF or AE signal from an external AF circuit or external AE circuit; a camera shake information based on a detection signal from a camera shake detection circuit consisting of an acceleration sensor or the like; etc. Since an unsuitable synthesized image results if synthesis is performed when a camera shake occurs, it is effective to display a suggestion for taking an image over again. Further, when the object has been detected as in a backlighted condition from AE information previously obtained on the basis of image data from CCD image pickup device before the taking of image or from AE information obtained from an external AE circuit, it is preferable to generate an SL synthesized image by means of SL taking, since the image data is likely to be of wide dynamic range when it is in a backlighted condition. Accordingly, it is also effective to display information on backlighted condition. Furthermore, dynamic range, luminance difference, histogram of luminance, etc., which are the types of information related to the brightness of object are also effective as SL taking information and preferably displayed.

Further, among the image taking conditions, etc., to be set on the camera before the taking of image, information on strobe emission modes is mentioned first as the camera setting information serving as the suitability determining information related to SL taking. When image is taken in a strobe mode, motion of the object can in effect be stopped even when the object is moving, by taking image twice at different exposure amounts in a short time period with causing strobe emission. Since it is thus possible to obtain an SL synthesized image without a failure, the strobe emission mode is an effective information as the SL taking condition and is preferably displayed. Shutter speed is the one to be mentioned next among the types effective as SL taking information. A slow shutter speed results in a larger motion of object and is not suitable for SL taking. A high shutter speed becomes suitable for SL taking, since motion of the object can be reduced. Accordingly, a shutter speed is an effective information as SL taking information and is preferably displayed. Further, if, for example, the user effects spot metering in setting exposure, it is most likely the case where an attempt is made to take image with performing spot metering because of a backlighted condition. It is thus fitting to perform SL taking when set to a spot metering mode. Accordingly, the spot metering mode is an effective information for SL taking and is preferably displayed.

Furthermore, with a camera having a consecutive photographing function, since SL taking cannot be performed when in a consecutive taking mode, the SL taking must be switched OFF. Since too much motion is not likely to be involved in a scenery (distant view) photographing mode, SL taking is preferably turned ON when set to this mode. Since a large motion of object is likely in a sports photographing mode, SL taking is preferably turned OFF when set to this mode. Moreover, if set to a macro-strobe photographing mode, SL taking is suitable similarly as in the strobe mode. As the above, those set information as of exposure setting (spot metering), consecutive, scenery, sports, macro-strobe taking, etc., are the types of information effective for the suitability determination of SL taking and are displayed.

With a camera having zoom, since a higher zoom ratio results in a magnified motion and is not suitable for SL taking, it is necessary to turn OFF SL taking. Accordingly, a zoom ratio, too, becomes an effective information for switching ON/OFF of SL taking and thus is displayed. Further, when the image pickup apparatus is so constructed as to cause an externally connected personal computer or the like to perform the generation processing of SL synthesized image, it is necessary in SL taking to store image data corresponding to two frames of different exposure amounts to a memory card. Means for detecting the remaining memory capacity of the memory card is thus provided to detect the remaining memory capacity. Since SL taking cannot be performed when the remaining memory capacity has become less than the capacity for storing image corresponding to two frames, SL taking is turned OFF and image is taken normally. Accordingly, the remaining capacity of memory, too, is a necessary information for SL taking and is displayed.

An indication of the suitability determining information obtained in connection with SL taking as described above is displayed on the LCD display section 31 (13) as shown in FIG. 7. By looking up such indication, if SL taking is turned OFF when set to the automatic SL taking mode, it is easy to identify which one of the information is unfitting and, if SL taking is to be performed manually, it is easy to determine whether each information is suitable for SL taking. It is also possible that information related to SL taking be displayed on the information displaying LCD 36, instead of being displayed together with an image as shown in FIG. 7. Further it may be so constructed that these indications can be turned ON/OFF.

A third embodiment will now be described. The above described second embodiment has been shown as that in which information necessary for determining the suitability for the generation of synthesized image is displayed on the display means. In some cases, however, it is difficult to manually determine at once whether it is suitable or unsuitable from the information displayed on the display means. In the third embodiment, this point is improved such that information obtained at each stage is displayed together with a determination result as to whether it is suitable for the generation of synthesized image.

Figure 8A:
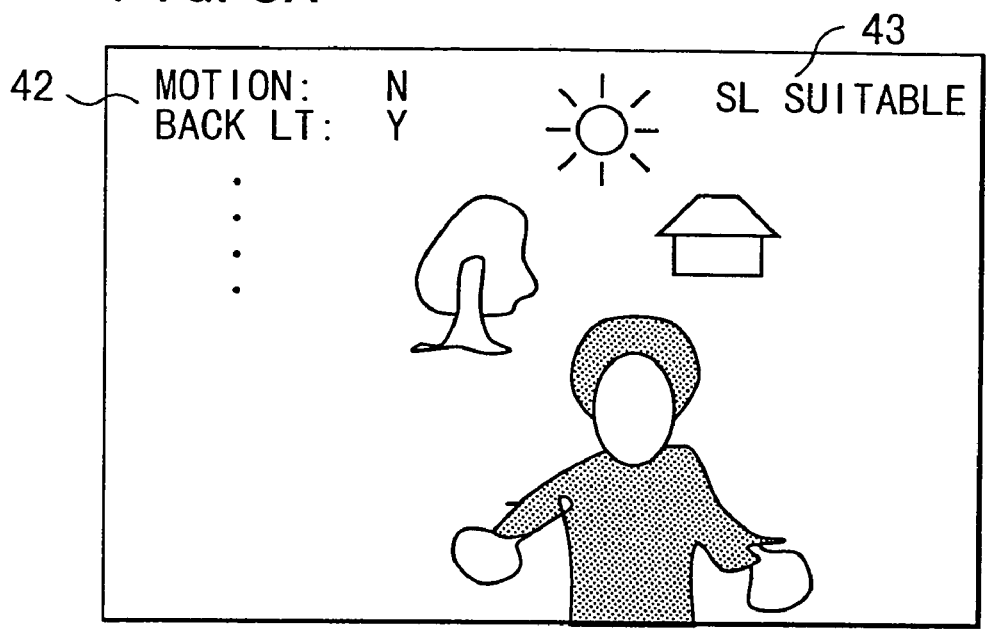
FIGS. 8A and 8B show a manner of displaying the determination results for respective information parameters to be used as the conditions for wide dynamic range image taking and the result of determination as to whether the wide dynamic range image taking is suitable as a whole.
Figure 8B:
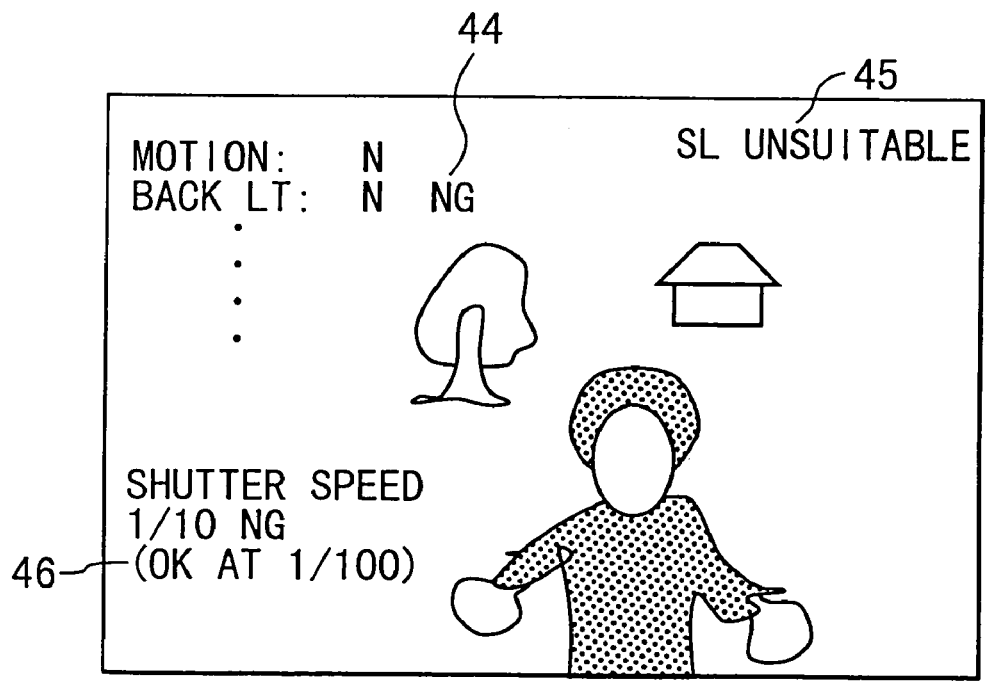

In an actual method of display, a determination result for each information parameter to be used as the SL taking conditions and a determination result of the suitability of SL taking as a whole are displayed. For example, as shown in FIG. 8A, if all the information parameters are suitable for SL taking, an indication of "SL Suitable" 43 is displayed together with the respective information parameters 42. On the other hand, if unsuitable information parameter exists, "NG" mark 44 is displayed for the unsuitable information parameters as shown in FIG. 8B and at the same time an indication of "SL Unsuitable" 45 is displayed to indicate that SL taking is unsuitable as a whole. It is then also possible as shown in FIG. 8B to additionally provide for those unsuitable information parameters an indication of suitable range 46 for indicating an extent by which "SL Suitable" can be achieved.

By displaying such indication, the reason for unsuitableness of SL taking can be confirmed at once. Depending on the cause of unsuitableness, it is possible to achieve suitable conditions by changing the image taking conditions. Further, if a suitable range is displayed, the level of unsuitableness can be comprehended and it is possible to know the extent of change by which suitable conditions can be achieved.

Figure 9:
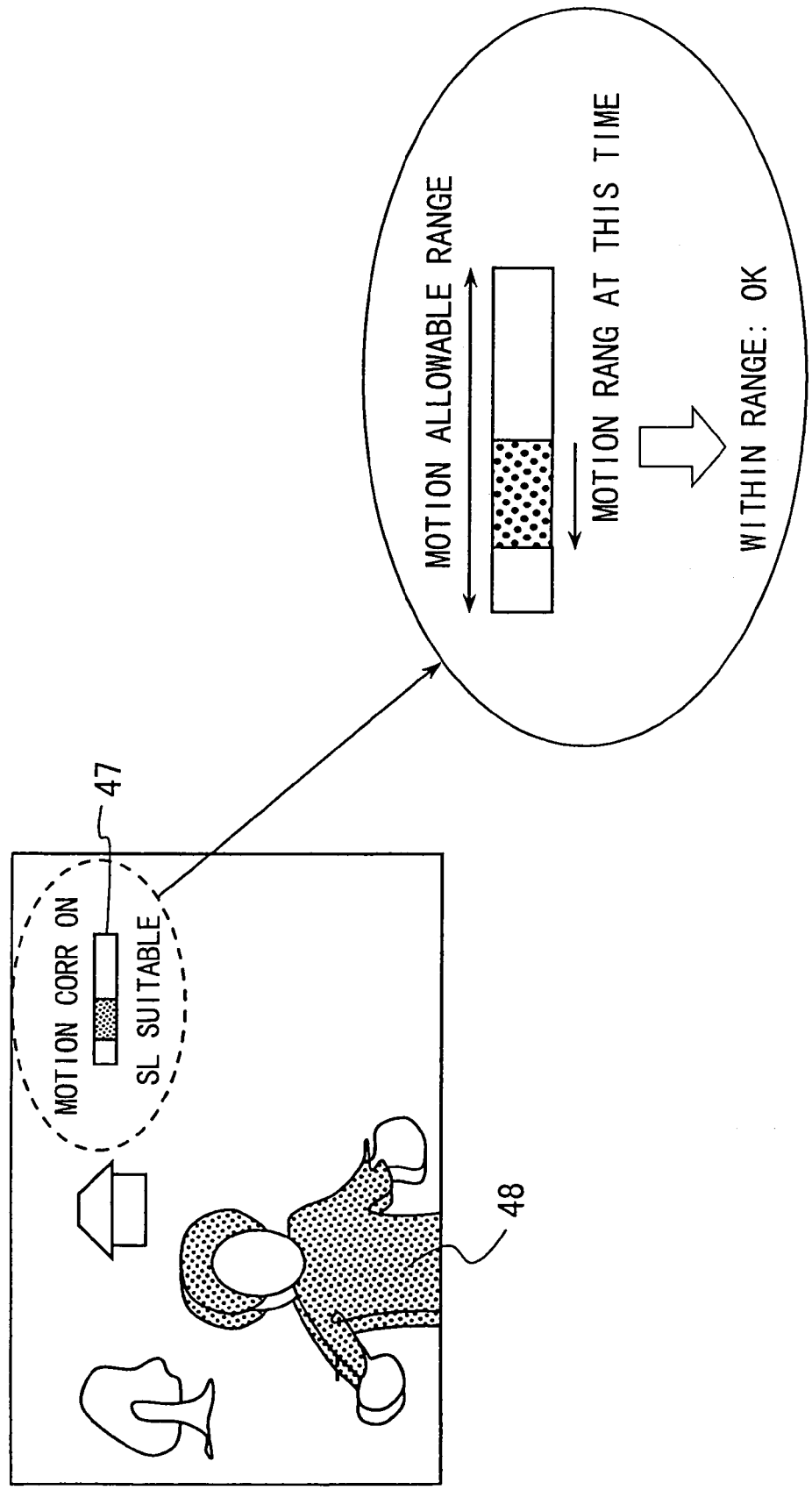
FIG. 9 shows a manner of displaying information on motion of the object.

The displaying of each information parameter to be used as the conditions for determining suitability of SL taking will now be described. First, the case of displaying information of motion of the object will be described below. If motion of the object is not detected, an indication of "SL Suitable" is displayed together with an indication of "Motion NO" or displaying of nothing. If motion is present, an indication of "SL Taking Unsuitable" is displayed at the same time of displaying of "Motion YES, NG". Further, if the amount of motion is within an allowable range for correction, an indication of "SL Suitable" is displayed at the same time of displaying "Motion Correction ON". If the amount of motion exceeds the allowable range for correction, an indication of "SL Unsuitable" is displayed at the same time of displaying of "Motion Correction NG". Furthermore, in respect of motion correction, it is also possible to display a motion correction allowable range 47 by a bar graph as shown in FIG. 9, so as to display the detected range of motion and/or direction of motion. It should be noted that, in FIG. 9, numeral 48 denotes an object which has been moved.

The displaying of camera shake information to be used as information for determining the suitability of SL taking will now be described. If camera shake is not detected, an indication of "SL Suitable" is displayed at the same time of displaying or nondisplaying of "Camera Shake NO". If camera shake has been detected, an indication of "Camera Shake YES NG" and an indication of "SL Unsuitable" are displayed. If correction of camera shake is possible, an indication of "SL Suitable" is displayed at the same time a mark of "Shake Correction ON". If correction of camera shake is not permissible, an indication of "Shake Correction NG" and an indication of "SL Unsuitable" are displayed.

In the case where information on detection of a backlighted condition is used as information for determining the suitability of SL taking, if a backlighted condition is detected, an indication of "Back Light YES" and an indication of "SL Suitable" are displayed. If a backlighted condition is not detected, an indication of "Back Light NO NG" and an indication of "SL Unsuitable" are displayed. Further, in the case where the types of information related to the brightness of object (dynamic range, luminance difference, histogram of luminance, etc.) are used as information for determining the suitability of SL taking, if dynamic range is wide, an indication of "D Range Wide" and an indication of "SL Suitable" are displayed. If dynamic range is narrow, an indication of "D Range Narrow NG" and an indication of "SL Unsuitable" are displayed. In any of the cases of a dark object, small luminance difference and no saturation of luminance, an "NG" mark and an indication of "SL Unsuitable" are displayed.

In the case where information set on the camera for image taking is used as information for determining the suitability of SL taking, for example when set to a strobe emission mode, an indication of "SL Suitable" is displayed at the same time of an indication of "Strobe ON". If it is set to non-emission of strobe, an indication of "SL Unsuitable" is displayed at the same time of an indication of "Strobe OFF NG". In the case of shutter speed, if set to a high speed, an indication of "SL Suitable" is displayed at the same time of indicating the shutter speed. If it is set to a slow speed, an indication of "SL Unsuitable" is displayed at the same time of an indication of the shutter speed and "NG". In respect of setting of exposure, when set to a spot metering mode or manual exposure correction mode, an indication of "SL suitable" is displayed at the same time of its indication. In the case of other exposure setting, an indication of "NG" is added to an indication of such setting and at the same time an indication of "SL Unsuitable" is displayed. In respect of setting of image taking modes (consecutive, scenery, sports, macro strobe), when set to scenery or macro strobe taking, an indication of "SL Suitable" is displayed at the same time of its indication. When set to consecutive or sports mode, an indication of "NG" is added to its indication and at the same time an indication of "SL Unsuitable" is displayed. In the case of setting a zoom ratio information, if in a wide (low-ratio) setting, an indication of "SL Suitable" is displayed at the same time of its indication. If in a telephoto (high-ratio) setting, an indication of "NG" is added to the displaying of such setting and at the same time an indication of "SL Unsuitable" is displayed. Further, when the remaining capacity of memory is used as information for determining the suitability of SL taking, the remaining capacity is indicated by a bar graph, etc., and at the same time, if a capacity corresponding to two frames or more is left, an indication of "SL Suitable" is displayed. If less than that corresponding to two frames, "NG" is added to the indication of remaining capacity concurrently of displaying "SL Unsuitable".

In the above description, when suitableness or unsuitableness as a whole of SL taking is indicated, the displaying is performed by including suitableness or unsuitableness of each information parameter to be used as information for determining the suitability of SL taking at the same time of displaying "SL Suitable" or "SL Unsuitable". However, it is also possible to indicate only those information parameters of "SL Unsuitable", i.e., to which "NG" mark is added while without indicating those information parameters which are suitable for SL taking. It is furthermore possible to switch the setting between the case of displaying suitableness or unsuitableness of SL taking as a whole at the same time of the detailed displaying related to each information parameter and the case of displaying only suitableness or unsuitableness of SL taking as a whole without displaying an indication related to each detailed information parameter.

Further, it is also possible to render the displaying related to each information parameter at the respective steps of recording or reproduction in the image pickup apparatus. In particular, after setting the conditions of image taking to the camera, information parameter based on each set condition is displayed and at the same time a result of determination of the suitability of SL taking is displayed. If unsuitable, an indication of warning is displayed by adding "NG" mark thereto. This can be reflected in changing the set conditions, etc. Further, after setting AE and before taking image, a determination result on the suitability of SL taking is displayed at the same time of indicating each information parameter obtained before the taking. If unsuitable, an indication of warning is displayed by adding "NG mark thereto. It is thereby possible to effect a change in the taking conditions, etc.

Furthermore, after the taking of image, SL suitability is determined on the basis of the information parameters obtained from the previously taken image data. If unsuitable, an indication of warning is displayed by similarly adding "NG" mark thereto. A decision is thereby made for example about retaking of image. Moreover, a determination result on SL suitability can be indicated even after the processing of SL synthesized image; an indication of warning, if unsuitable, can be used in determining whether it should be recorded to the memory card 15 or be erased. Even at the time of reproduction, a determination result on SL suitability can be displayed for the reproduced SL synthesized image; an indication of warning can be displayed, if unsuitable, so as to be also used in determining whether it should be erased, etc.

It should be noted that, while the above has been shown as that in which each displaying is shown on the LCD display section 31, it is also possible that the displaying be made on the information displaying LCD 36 or be displayed on a separately provided LCD display section. Further, the indication of warning to which "NG" is added and/or the indication of "SL Unsuitable" may be indicated not only visually but also as a warning sound of buzzer or the like.

A fourth embodiment will now be described. The above described third embodiment has been shown as that in which an indication of SL suitability as a whole is displayed at the same time of acquiring various information parameters to be used as the conditions for determining whether SL taking is suitable, thereby indicating respective suitability by determining their suitability for SL taking. In some cases, however, such determination result of SL suitability and the taking mode set by the user may not correspond. In the fourth embodiment, the fact of inconsistency is indicated when the taking mode (ordinary taking mode, forced SL taking mode, automatic SL taking mode) set by the user does not correspond to the displayed determination result of SL suitability as a whole determined on the basis of various information parameters to be used as the conditions for determining suitability of SL taking, so as to prevent an unsuitable SL image taking possibly resulting in a degraded image quality, etc., from being performed.

In other words, the determination result and the set taking mode do not correspond to each other for example in the case where "SL Suitable" is determined from the various information parameters but the normal taking mode is set or in the case where the forced SL taking mode is set when it is determined as "SL Unsuitable". Since a suitable image cannot be obtained if these are left unchanged, the fact of inconsistency is indicated so as to give a warning.

Figure 10A:
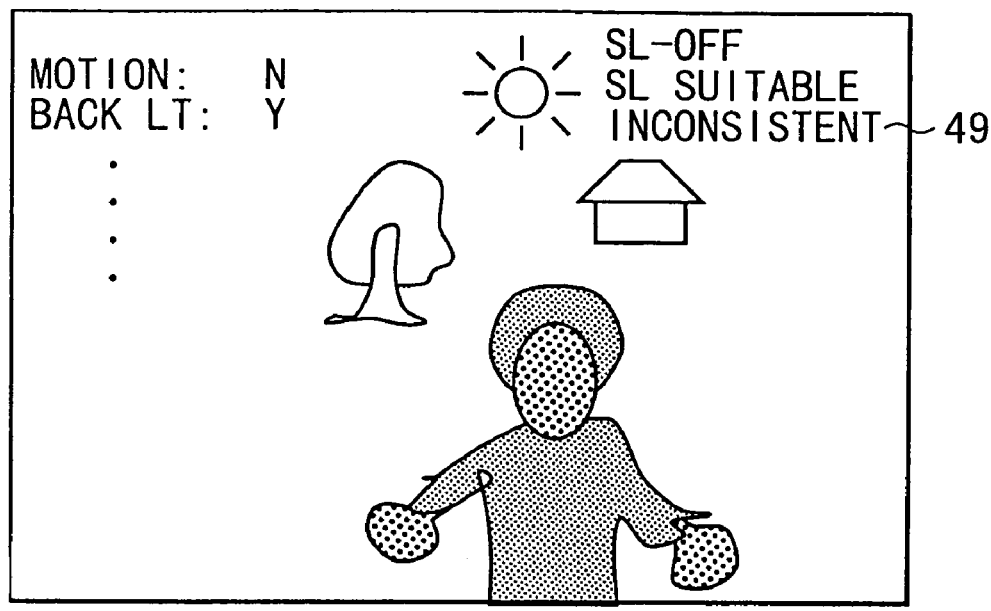
FIGS. 10A and 10B show displaying manner at the time of an inconsistency between the result of determination of wide dynamic range suitability and the set image taking mode.
Figure 10B:
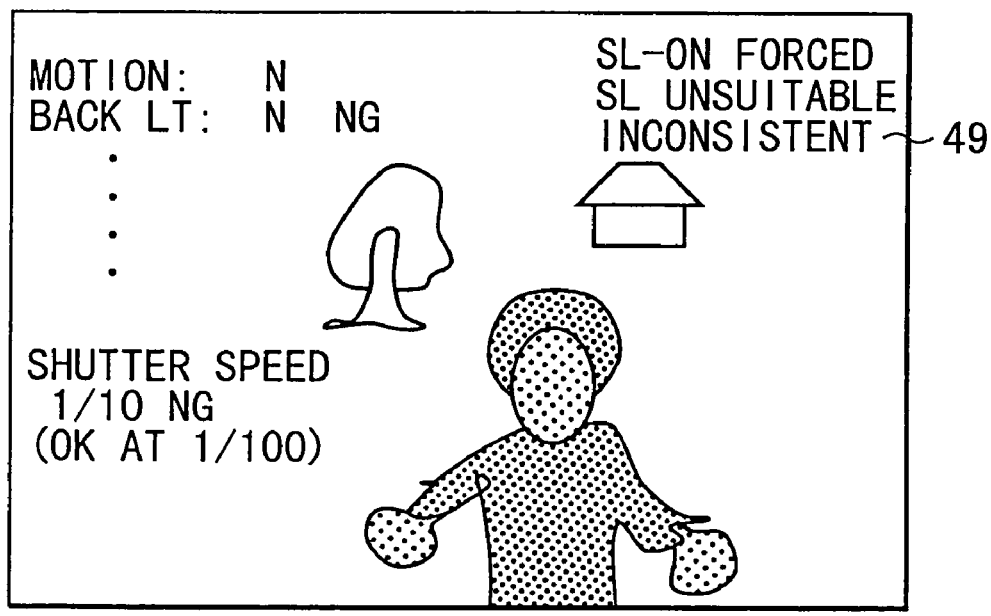

FIG. 10A shows a manner of warning by displaying an indication of "Inconsistency" 49 when, even though it is determined as "SL Suitable", the normal taking mode (SL-OFF) is set. FIG. 10B shows a manner of displaying an indication of "Inconsistency" 49 when, even though it is determined as "SL Unsuitable", the forced SL taking mode (SL-ON) is set.

A fifth embodiment will now be described. The present invention relates to image pickup apparatus having SL image taking function for obtaining wide dynamic range, synthesized image by means of synthesis of image signals which are obtained by taking image twice with changing exposure amount. In the present embodiment, displayed are: the ratio of exposure amounts (exposure time, emission amount) of the image signals of two frames of different exposure amounts which are to be subjected to the generation processing of wide dynamic range, synthesized image; and/or the dynamic range of the synthesized image to be generated by the synthesizing process. Further, in the case where it is possible to select one from a number of exposure amount ratios, a predetermined exposure amount ratio is set by the selection and is indicated.

Figure 11A:
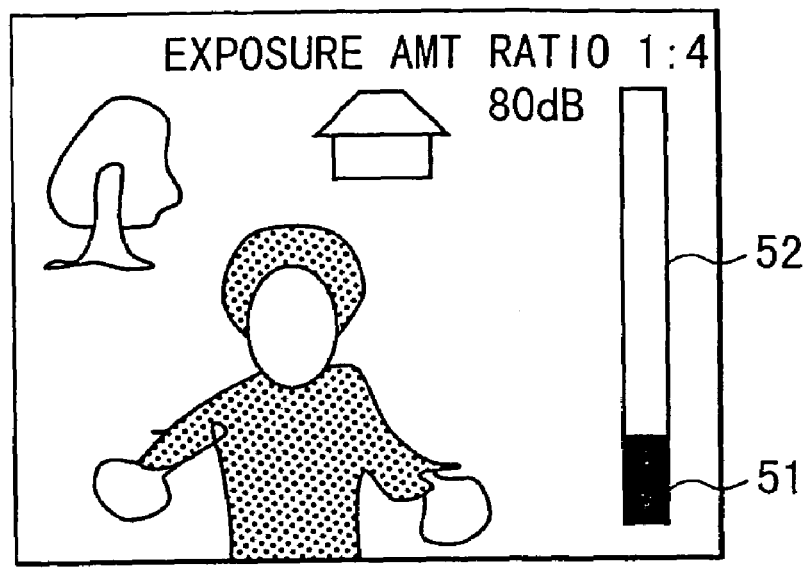
FIGS. 11A and 11B show a manner of displaying exposure amount ratio of the two frames to be synthesized and dynamic range of the synthesized image.
Figure 11B:
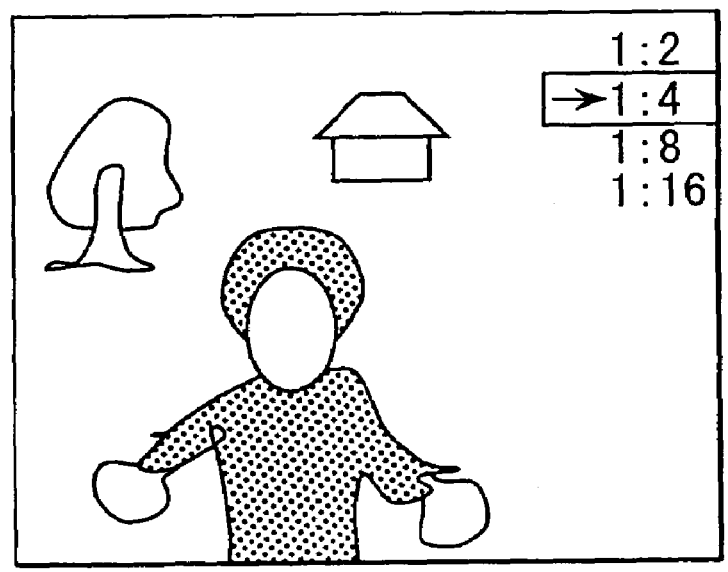

FIG. 11A shows an example where the case of an exposure amount ratio of 1:4 and a dynamic range of 80 dB is indicated by characters and in addition the exposure amount ratio is represented by a bar graph. It should be noted that, of the bar graph in FIG. 11A, the black portion represents a proportion of short-time exposure 51 and the framed white portion represents a proportion of long-time exposure 52. FIG. 11B shows the state of setting the exposure amount ratio of 1:4 by selection in the case where an exposure amount ratio can be selected from 1:2, 1:4, 1:8, 1:16. In a case such as the above where a definite exposure amount ratio can be set by selecting from a number of exposure amount ratios, an exposure amount ratio is selectively indicated by means of the menu setting buttons 32 shown in FIG. 2 and the "+" button, "−" button and "OK" button are operated to set a predetermined exposure amount ratio.

A sixth embodiment will now be described. In general, with a camera having function for generating wide dynamic range, synthesized image, two images are taken by previously setting exposure amount ratio thereof. The exposure amount ratio of the two images actually taken, however, is not necessarily the same as the set value. If they are synthesized in such case, there is a disadvantage that a discontinuity in gradation or the like tends to occur at the seam between the two images. This embodiment intends to mitigate this problem.

Specifically, in this embodiment, a camera having function for generating wide dynamic range, synthesized image includes exposure amount correction means so that a correction of exposure amount is performed when a taking mode requiring exposure amount correction has been set and at the same time an operation status such as the occurrence or nonoccurrence of correction at the exposure amount correction means is indicated on the display means.

In particular, it is so constructed as to perform an exposure amount correction when a strobe image taking mode has been set. In other words, when taking image by using a strobe, the exposure amount depends not on the shutter speed but on the emission amount of the strobe. Since the strobe emission amount cannot so accurately be controlled, a considerable variance may occur in the exposure amount. Accordingly, exposure amount is corrected when a strobe mode is set.

The correcting operation of exposure amount is performed as follows. Image data with a smaller exposure amount and image data with a greater exposure amount obtained by two times of image taking using strobe emission are stored to the two memories, i.e., SE memory 6-1 and LE memory 6-2 of the camera signal processing circuit shown in FIG. 3. These are supplied to CPU 8 and regions are extracted of those without lack of detail at low level portion in the SE image data and those without lack of detail at high level portion in the LE image data. Sums $\Sigma$ SE, $\Sigma$LE of pixel data of the extracted regions are obtained. An actual exposure amount ratio A' is obtained by the ratio $\Sigma$LE/$\Sigma$SE of the two. The synthesizing process is performed by multiplying the low exposure image data SE and the actual exposure amount ratio A'. A discontinuity in gradation at the seam between the two image data is thereby prevented.

The exposure amount is thus corrected by the exposure amount correction means. In the present embodiment, such operation status of the exposure amount correction means, i.e., whether exposure amount is to be corrected or whether it has been corrected is displayed on the display means before or after the correction. If correction has been performed, an indication of exposure amount ratios before and after the correction and extent of the correction, etc., is additionally displayed. By thus displaying such indication, it is possible to confirm not only the occurrence or nonoccurrence of correction of exposure amount ratio but also a shift in exposure amount ratio and/or dynamic range based on the corrected exposure amount ratio.

Figure 12A:
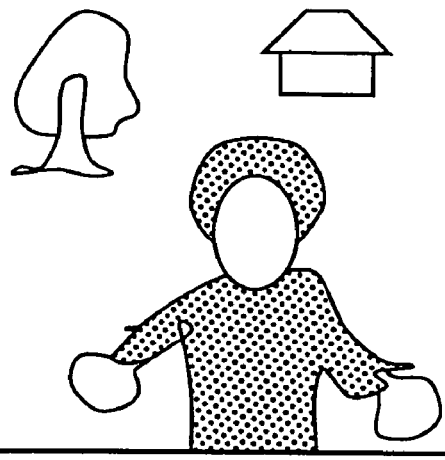
FIGS. 12A and 12B show a manner of displaying correction of exposure amount ratio.
Figure 12B:
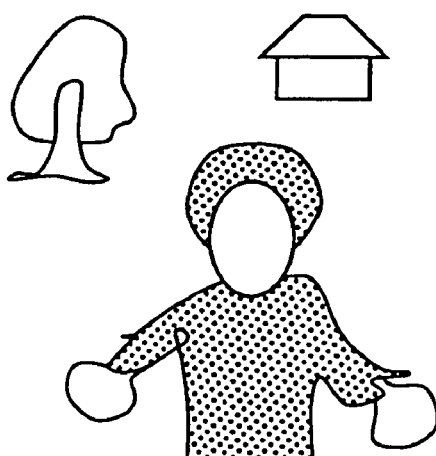

FIG. 12A shows a manner of displaying in the case where exposure amount ratio is to be corrected, representing an example of displaying an indication 53 of "Correcting Exposure Ratio" before the correction or Corrected Exposure Ratio" after the correction, the corrected exposure amount ratio (1:9) and correcting rate (1.25 times). FIG. 12B shows a manner of displaying in the case where correction of exposure amount ratio is not to be performed, representing an example where an indication 54 of "Not Correcting Exposure Amount Ratio" is displayed. It should be noted that, in this case, it is also possible to indicate the status of not performing correction by displaying nothing.

A seventh embodiment will now be described. In image pickup apparatus having function for generating wide dynamic range, synthesized image, a failed, synthesized image is outputted if the object has been moved at the time of taking two images at different exposure amounts. When a motion has been detected, therefore, the generation processing of synthesized image is not usually performed. However, when the detected motion amount has been relatively small and determined at CPU 8 as within an allowable range for correction, the motion is corrected and the generation processing of synthesized image is performed. In the present embodiment, the correction amount of motion is indicated on the display means at the same time of the manner of operation before and after performing such motion correction.

In a technique for correcting motion, if, for example, regions in a horizontal direction are taken into consideration, values are used of pixels A, B in regions without an occurrence of motion, at a suitable distance d for performing correction from the two ends of the region to be corrected of motion. The A, B pixels are determined as at two ends and the motion is corrected by interpolating the region to be corrected of motion so as to uniformly change pixel values between the two.

Figure 13A:
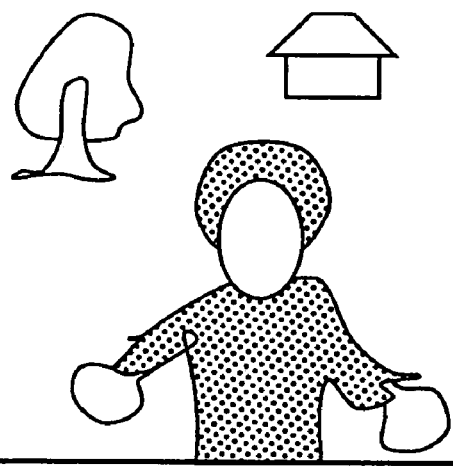
FIGS. 13A and 13B show a manner of displaying correction of motion.
Figure 13B:
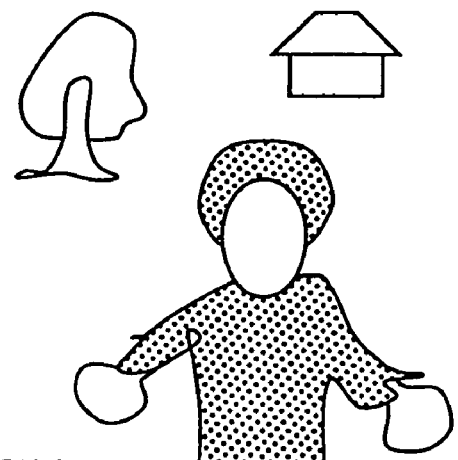

FIG. 13A shows a manner of displaying in the case of correcting motion, representing an example where an indication 55 of "Correcting Motion" before the correction or "Corrected Motion" after the correction and a correction amount (10% of angle of view from left and right sides) 56 are displayed together. FIG. 13B shows a manner of displaying in the case of not correcting motion, representing an example where an indication 57 of "Not Correcting Motion" is displayed. It should be noted that, in this case, it is also possible to indicate the status of not performing correction by displaying nothing.

An eighth embodiment will now be described. In this embodiment, an image pickup apparatus having function for generating wide dynamic range, synthesized image is provided with three image taking modes, i.e., a normal taking mode for generating image pickup signals corresponding to one frame from CCD image pickup device, a forced SL taking mode for forcing a generation of SL synthesized image, and an automatic SL taking mode for selectively generating SL synthesized image automatically on the basis of information of the object or of image taking conditions set on the camera. The actual ON/OFF status of the generation processing of SL synthesized image due to the setting made by selecting one from these taking mode is indicated on the display means.

Figure 14:
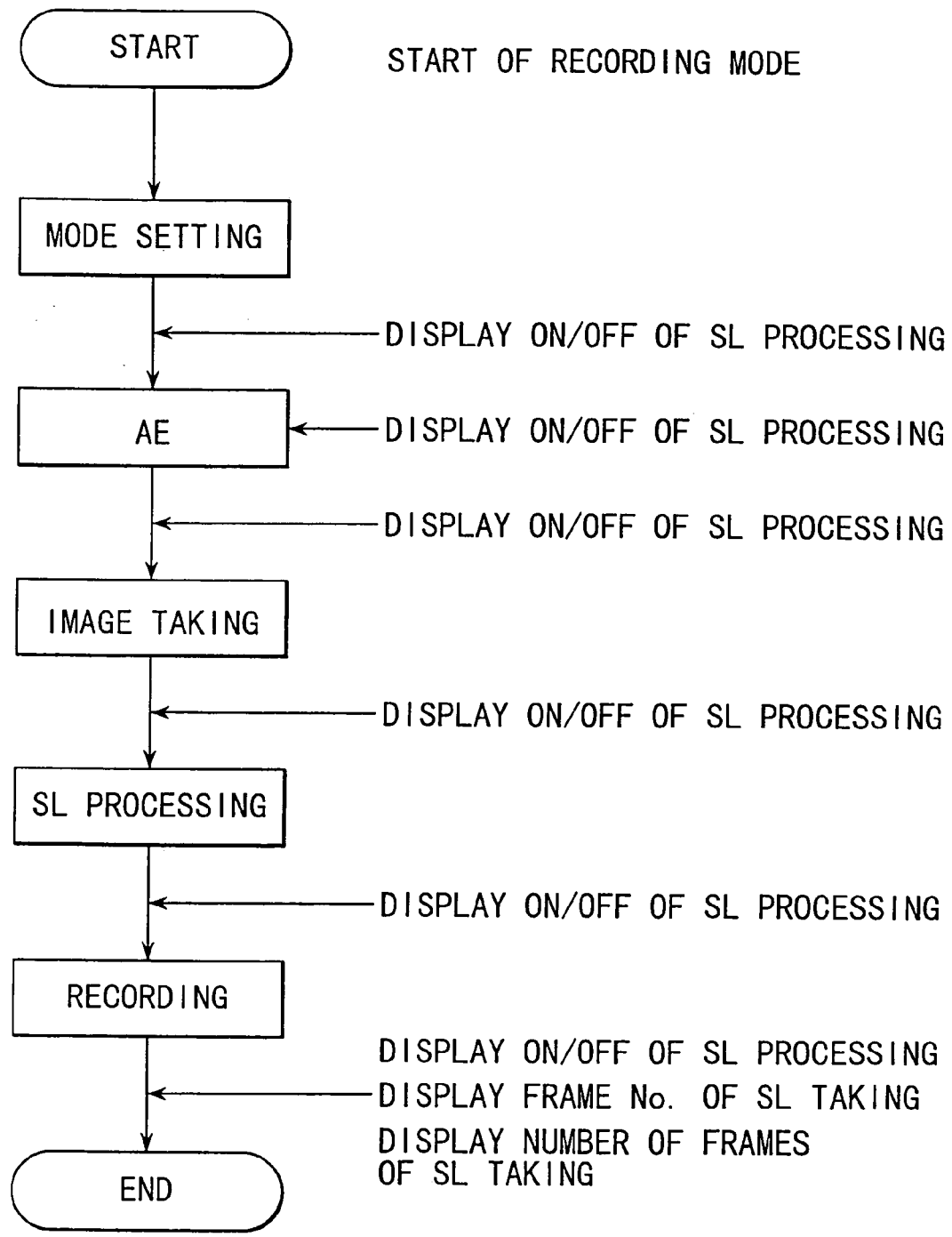
FIG. 14 explains the stages at which ON/OFF status of the generation processing of wide dynamic range, synthesized image is displayed.

By displaying such ON/OFF status of the generation processing of SL synthesized image, it is readily possible to confirm whether the generation processing of SL synthesized image will actually be performed or whether it has actually been performed. Such displaying can be effected at various stages during the recording process. In particular, as shown in the flowchart of FIG. 14, it can be displayed for example after the setting of taking mode, at the time of detection of AE information, before the taking of image, before the generation processing of SL synthesized image, before the recording, and directly after, the recording. Here, if it is displayed before the taking of image, the image taking conditions can be changed by considering such displayed information. Further, since SL image taking can be switched to ON or OFF if it is displayed before the generation processing of SL synthesized image, it can be used as information based on which the user makes a decision as to whether to take image in the normal taking mode or to take image in the forced SL taking mode. Furthermore, if displayed before the recording, it can be used for example as information for making a selection where image is recorded when SL processing is ON but is erased when SL processing is OFF. Moreover, if displayed after the recording, it can be used as information for deciding storage or erasing by displaying the fact that SL processing of the recorded image was ON or OFF.

Figure 15A:
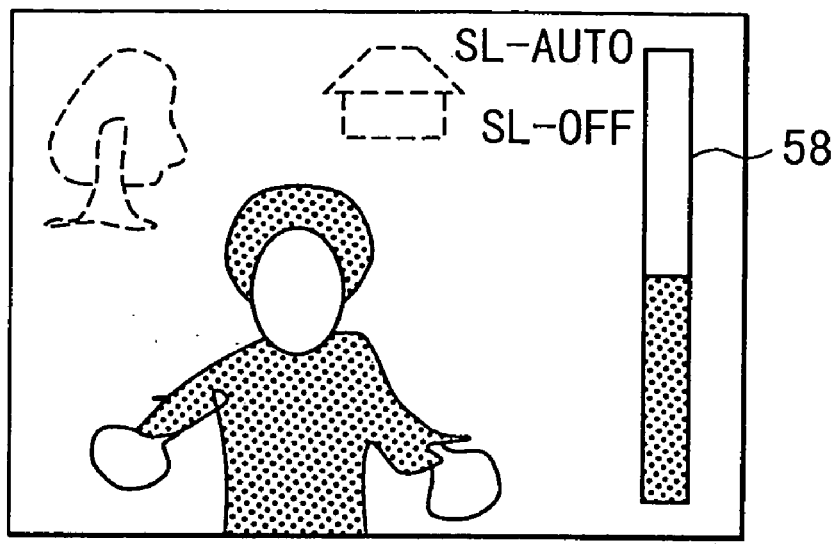
FIGS. 15A and 15B show a manner of displaying ON/OFF of wide dynamic range synthesizing process.
Figure 15B:
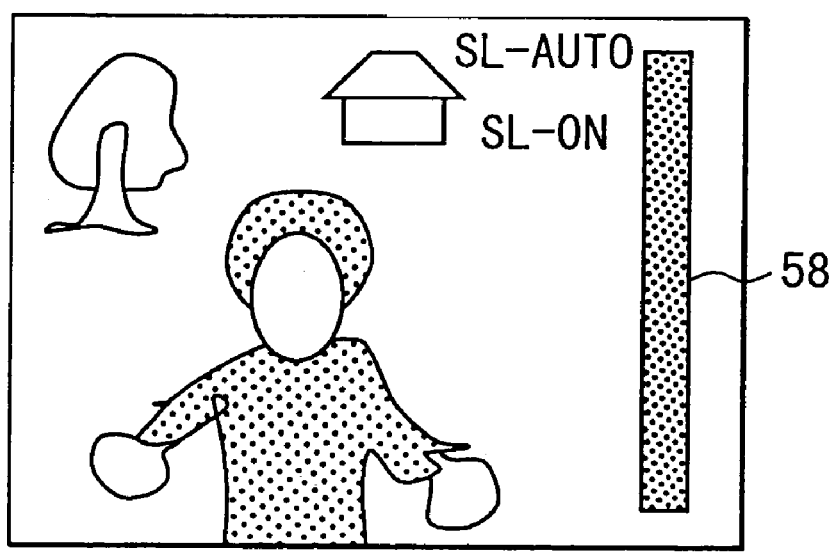

FIGS. 15A and 15B each show a displaying manner of ON/OFF of SL synthesizing process. FIG. 15A shows a manner of displaying the state where SL synthesizing process is OFF in the automatic SL taking mode, indicating in the upper row that the apparatus is in the automatic SL taking mode (SL-AUTO) and in the lower row that SL synthesizing process is OFF (SL-OFF). FIG. 15B shows the state where SL synthesizing process is ON (SL-ON) in'the automatic SL taking mode (SL-AUTO). It should be noted that, in FIGS. 15A and 15B, a bar graph 58 represents dynamic range.

Figures 16, 17:
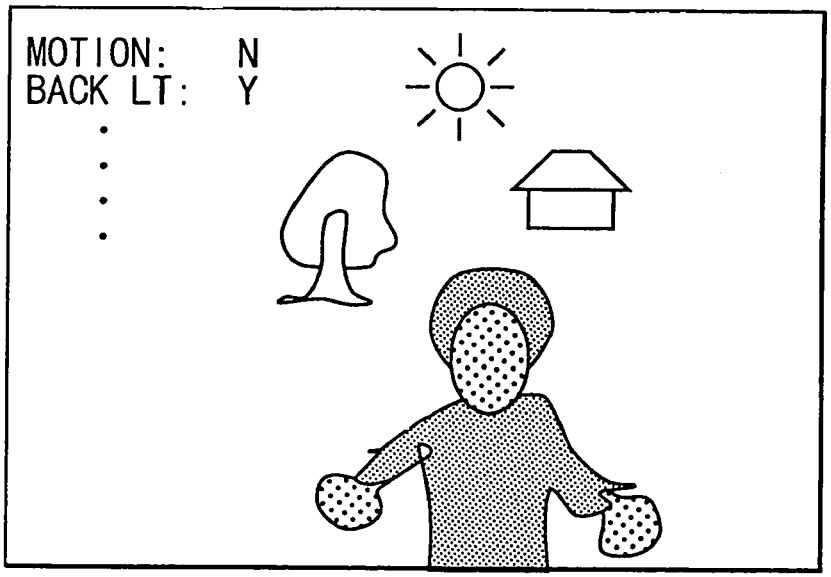
FIG. 16 shows a manner of displaying a list of taking modes with respect to all of the previously recorded images.
FIG. 17 shows a manner of displaying the image taking information for the generation of wide dynamic range, synthesized image as superimposed on the wide dynamic range, synthesized image.

Further, an indication of ON/OFF of SL synthesized image can be displayed in the form of a list as shown in FIG. 16, such that information as to whether it is an SL synthesized image or is an image taken in the normal taking mode is stored to a part of RAM within CPU 8 or DRAM 11 with respect to each of all the previously taken images. Referring to FIG. 16, the left end column indicates frame numbers and SL (SL synthesized image) or NOR (normal image) is displayed in a manner corresponding thereto. Further, regarding the displaying with respect to all the previously taken images, since a processed image is to be recorded on the memory card 15, information as to whether it is an SL synthesized image or a normal image can be stored as an incidental information of image file when the image is recorded to the memory card 15.

By storing as described above ON/OFF of SL processing, i.e., information of SL synthesized image or normal image, it is possible also at the time of reproduction to readily identify the taken image as to whether it is an SL synthesized image or a normal image.

A ninth embodiment will now be described. In this embodiment, SL synthesized image is displayed on the display means so that an actual SL synthesized image can be confirmed. The SL synthesized image can either be an SL synthesized image corrected of exposure amount ratio or an SL synthesized image corrected of motion, thereby a synthesized image without a failure can be displayed. Further, in displaying SL synthesized image, it is also possible as shown in FIG. 17 to superimpose information relating to the image taking for generating the SL synthesized image. The types of information to be superimposed may include image taking information parameters (motion, backlighted condition, etc.), SL suitability, exposure amount ratio, the occurrence or non-occurrence of correction of exposure amount ratio, the occurrence or non-occurrence of correction of motion, information for representing brightness, and information for representing dynamic range.

Figure 18A:
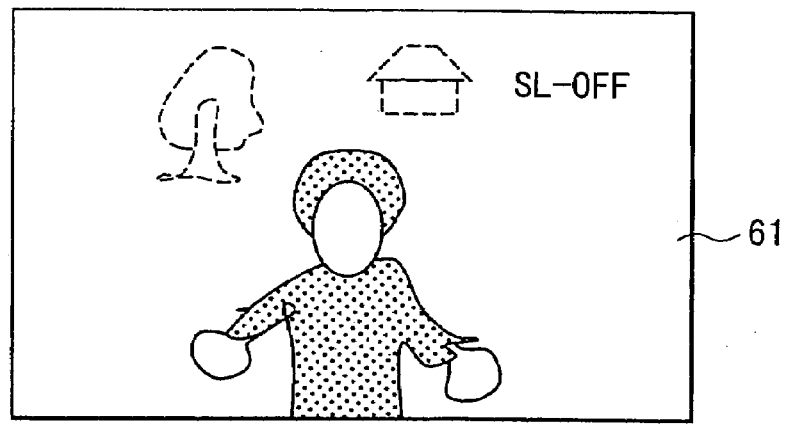
FIGS. 18A and 18B show a manner of displaying by switching between an normally taken image and a wide dynamic range, synthesized image.
Figure 18B:
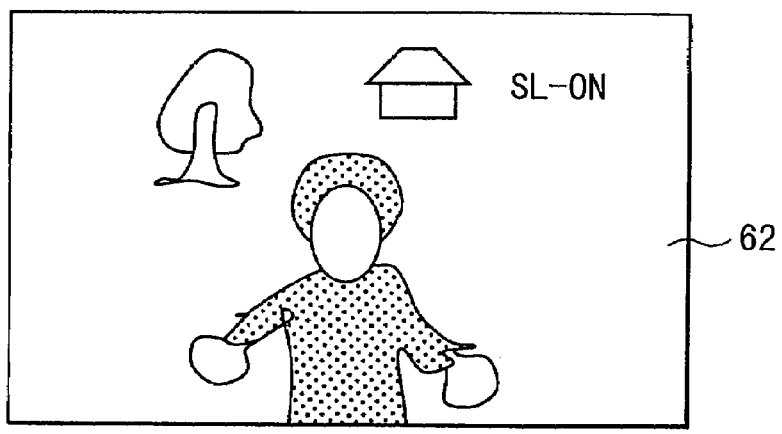
Figure 19:
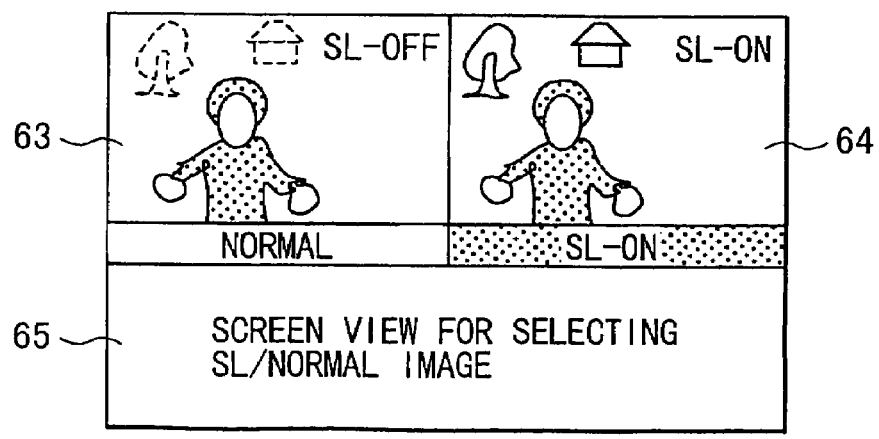
FIG. 19 shows a manner of concurrently displaying a normally taken image and a wide dynamic range, synthesized image.

Further, in a modification of this embodiment, it is also possible to indicate on the display means not only an SL synthesized image but also a normally taken image (long-time exposure image). When SL synthesized image and normally taken image are to be displayed, switching can be made to alternately display an ordinarily taken image (SL-OFF) 61 and an SL synthesized image (SL-ON) 62 as shown in FIG. 18, or an ordinarily taken image 63 and an SL synthesized image 64 be displayed together as shown in FIGS. 19A and 19B. It is thereby possible for the user to observe both images to select one or the other as an image to be recorded. In this case of concurrent displaying, it is also possible to indicate which one of the images is currently selected by the user (the illustrated example indicating by the dotted mesh the fact that SL synthesized image is selected). In such case, it is preferable to additionally display an indication (SL Image/Normal Image Selection Frame) 65 of the fact that the apparatus is in a mode for selecting image.

Figure 20A:
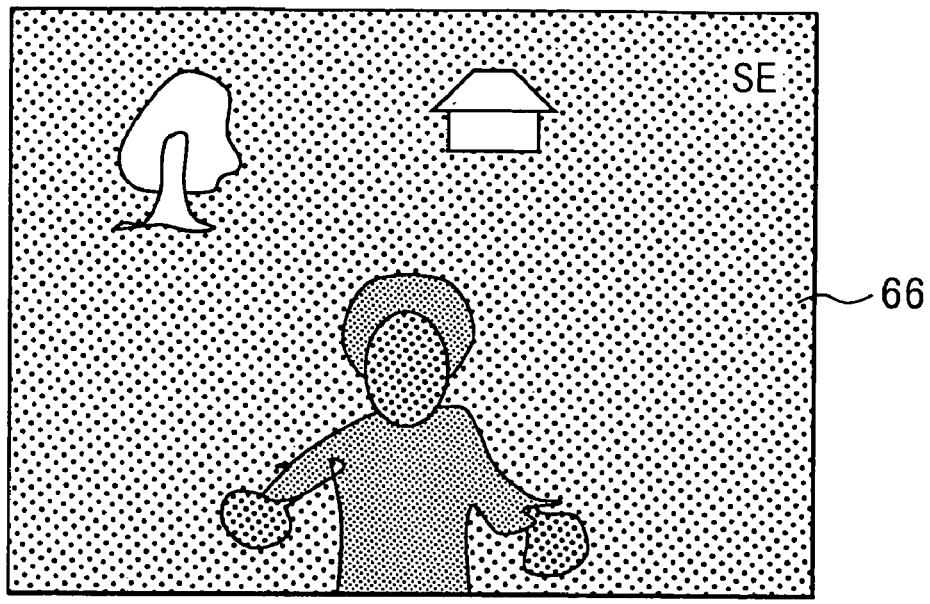
FIGS. 20A and 20B show a manner of displaying by switching between a short-time exposure image and a long-time exposure image before their wide dynamic range synthesizing process.
Figure 20B:
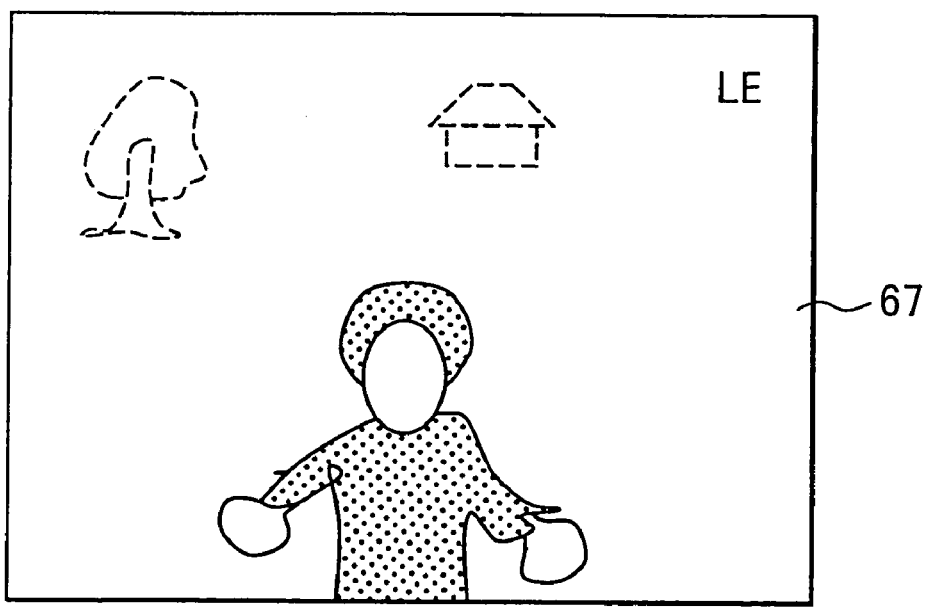

In another modification, as shown in FIGS. 20A and 20B, a short-time exposure image (SE image) 66 and a long-time exposure image (LE image) 67 before the SL synthesizing process can be displayed alternately or concurrently. By thus displaying a short-time exposure image and a long-time exposure image, it is possible to confirm with respect to the short-time exposure image whether lack of detail at high level portion occurs in those portions (portions of tree and house) intended to be acquired and to confirm with respect to the long-time exposure image whether lack of detail at low level portion occurs in the portion (person) intended to be acquired. As a result of confirming these, it is possible to expect that a suitable SL synthesized image can be obtained.

In displaying images as the above, the displaying of each image can be effected at various points including before and after the SL synthesizing process such as before the recording or after the recording. If displayed before the recording, the images can be confirmed at the time of changing the image taking conditions, selecting normally taken image or SL synthesized image, or making a selection as to recording or erasing. Further, if displayed after the recording, the images can be confirmed when making a selection as to storage or erasing of the recorded image.

Further, in still another modification, the short-time exposure image and long-time exposure image taken for the generation of an SL synthesized image are recorded intact as two pieces of image data to the memory card without being subjected to synthesizing process. At the time of reproduction, then, the above described two pieces of image data are read out and each image is displayed. If, as a result of observing these images, they are determined as those from which an SL synthesized image should be generated, SL synthesizing process is performed and they are reproduced and displayed as an SL synthesized image.

A tenth embodiment will now be described. In the above described embodiments, various information parameters and/or image taking modes are set and these types of set information are displayed at various stages before and after the taking of image. In the present embodiment, the suitability of image taking mode and information parameter is automatically determined at various stages. If before the taking of image, directions are given for a change in the setting of information parameters or set image taking mode so that a change in the setting can be made at various stages. Further, if after the taking of image, directions for retake are given before and after the SL processing or before and after the recording so that image can be taken anew. The SL suitability is thereby automatically determined and it becomes possible to take image of an improved image quality.

The above described change in the setting of information parameter or image taking mode or the operation of retaking may be performed either manually or automatically. Here, if the setting of information parameter is to be changed, the apparatus is brought into a setting changing mode as shown in FIG. 21A, where an indication 71 of the fact that the setting is going to be changed is displayed and the items to be changed and their values before and after the change are displayed in a combination. Further, in the case of retaking image, an indication 72 of the fact that image is going to be taken anew and, if the retake is to be performed automatically, an indication of the fact that it is automatic are displayed as shown in FIG. 21B and, in addition, an indication of confirmation by the user, if made, is preferably displayed. Such technique for automatically performing change in setting or retake can also be applied to an ordinary image pickup apparatus which is not provided with SL image taking function.

Figure 22A:
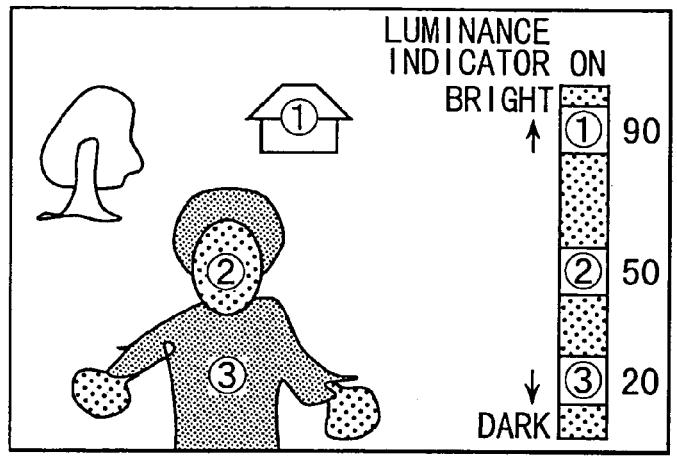
FIGS. 22A to 22C show a manner of displaying brightness information of a desired portion of the object.

An eleventh embodiment will now be described. In this embodiment, information of brightness of desired portions, for example of the darkest portion and the brightest portion, of object are displayed on the display means together with an image of the object. In particular, as shown in FIG. 22A, the brightest portion (the house) ①, the darkest portion (the torso of the person) ③, and the portion at an intermediate brightness (the head of the person) ② of the object are pointed out on the image as the portions of which brightness is to be indicated. At the same time, luminance of each of the portions ①, ②, ③ is correspondingly displayed on a bar graph which represents dynamic range. The portions ①, ②, ③ of which brightness is to be indicated can be moved at will to desired portions.

Figure 22B:
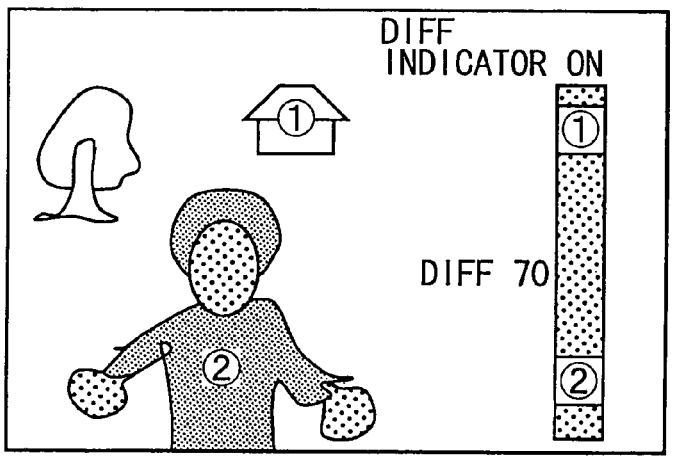
Figure 22C:
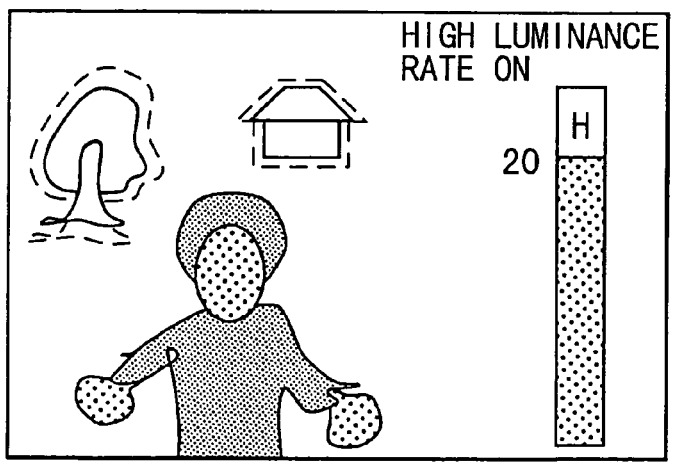

Further, as shown in FIG. 22B, luminance difference can also be displayed in combination. Furthermore, as shown in FIG. 22C, it is also possible to indicate by means of a numeric value and bar graph the percentage of the high luminance portion (the portions of tree and house surrounded by dotted lines in the illustrated example) to the whole image. It should be noted that the case of a larger percentage of high luminance portion is suitable for the generation processing of SL synthesized image. A threshold is set within the overall range of luminance and those values above such threshold value are determined as high luminance portions. The threshold can be varied by means of numeric values or bar code setting.

The above described indication of brightness can be displayed at various stages of recording process, i.e., before and after the taking of image, before and after the SL processing, before and after the recording, etc. If displayed before the taking of image, it can be used as determining information for example for making a change in the image taking conditions. If displayed after the taking of image, it can be used as determining information for example in the case where image is to be retaken by changing the image taking conditions. If displayed after SL processing, it can be used in determining whether SL synthesized image is to be recorded or to be erased. If displayed after the recording, it can be used also in determining whether the SL synthesized image is to be erased and at the same time it can be recognized as an incidental information of the recorded image.

A twelfth embodiment will now be described. Usually, an exposure amount ratio is previously set of two images of different exposure amounts to be used for the generation of SL synthesized image and, on the basis of such exposure amount ratio, dynamic range of synthesized image is set. In the present embodiment, however, object portions of an actual image desired to be acquired is designated by the user so that a dynamic range can be set at will by means of a visual method.

Figure 23A:
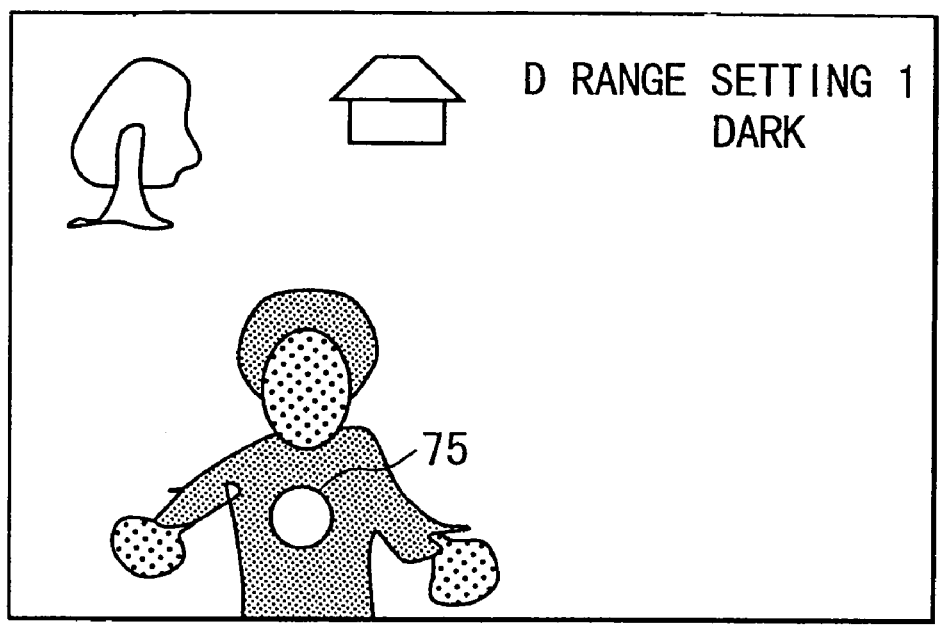
FIGS. 23A and 23B show a manner of designating portions of the object so as to set a dynamic range by using a visual method.
Figure 23B:
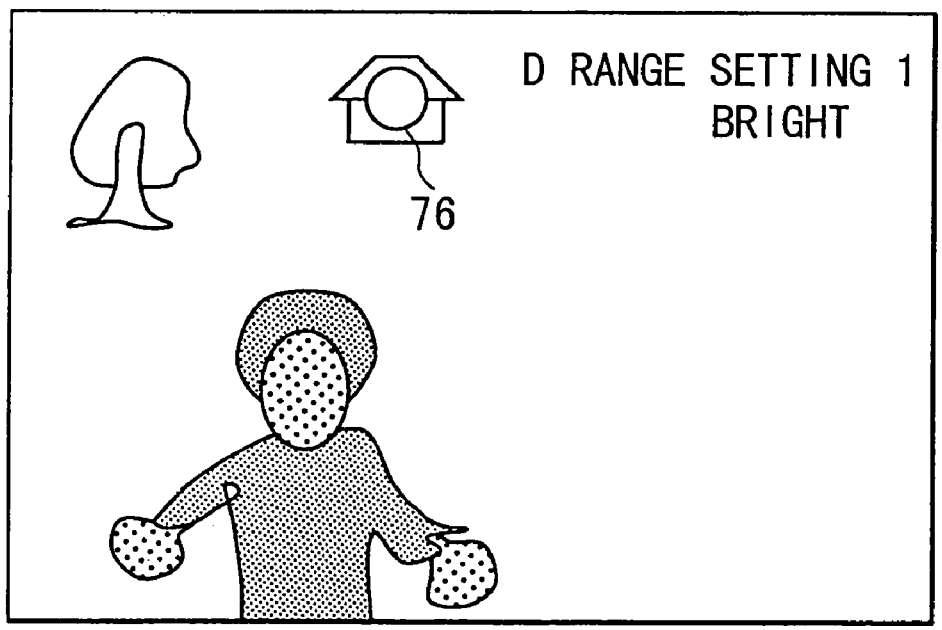

In particular, as shown in FIG. 23A, an image taken in at the time of AE or an image obtained by a previous image taking is displayed. A darkest narrow region (the torso of the person) 75 is designated as a spot locked area and a darkest portion luminance information is obtained from the lowest or mean luminance value of such designated portion. In a similar manner as shown in FIG. 23B, an image taken in at the time of AE or an image obtained by a previous image taking is displayed and a brightest portion luminance information is obtained from the highest or mean luminance value in the brightest narrow region (the house building) 76. The shutter speed is then set respectively for two images so that the darkest portion luminance information and brightest portion luminance information obtained in the above described manner are respectively brought to suitable levels in an SL synthesized image. The dynamic range of synthesized image is set on the basis of the set shutter speeds. In a modification, it is also possible that one of the darkest portion or the brightest portion is previously provided as an established value so that operation is simplified by setting only the other. It is furthermore possible to set a suitable exposure portion based on which a brightness information serving as the center of dynamic range is set.

It should be noted that, in order to designate a desired narrow region within an image, the framing of a previously set narrow region is set and locked on a desired region on the image for example by using the menu buttons so as to designate it by means of marking.

Figure 24A:
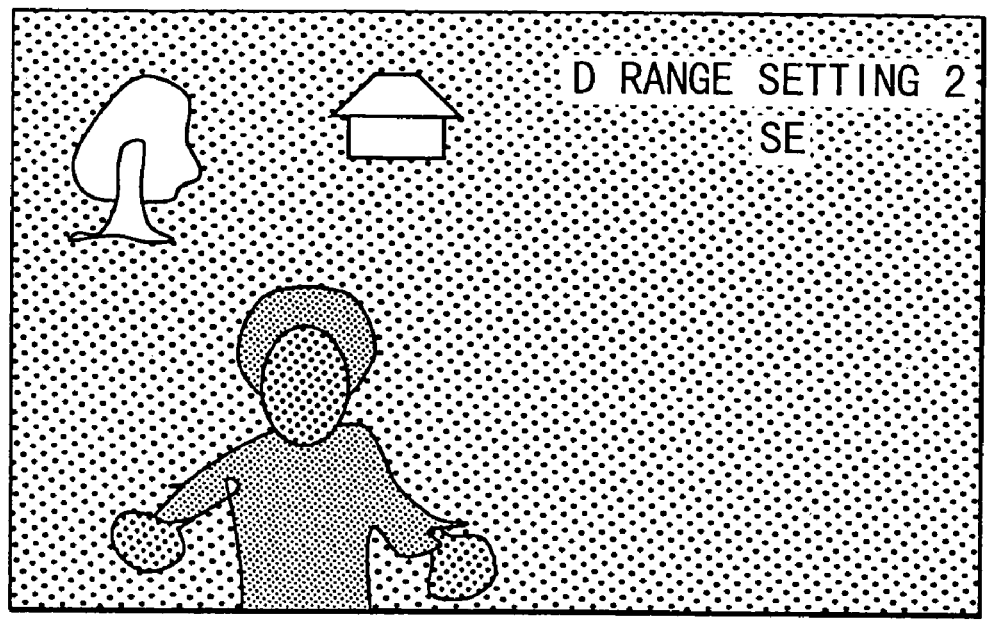
FIGS. 24A and 24B show a manner of displaying a short-time exposure image and a long-time exposure image so as to set a dynamic range of synthesized image on the basis of exposure amount ratio of the two images.
Figure 24B:
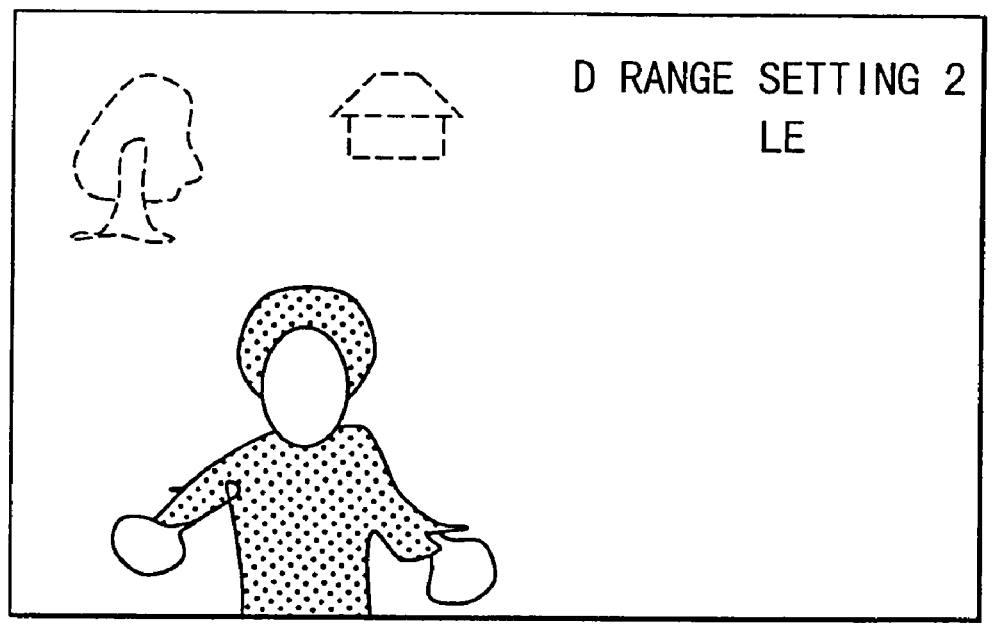

A modification of this embodiment will now be described. In this modification, a short-time exposure image and a long-time exposure image are directly set by the user so that dynamic range of synthesized image is set on the basis of the exposure amount ratio of these images. In particular, a short-time exposure image SE is displayed as shown in FIG. 24A and the user is to set an exposure amount by considering to what extent the range without lack of detail at high level portion should be. Further, the long-time exposure image LE is displayed as shown in FIG. 24B, and the user sets an exposure amount by considering to what extent the range without lack of detail at low level portion should be. The dynamic range of synthesized image is then set on the basis of exposure amounts of the two images of which the exposure amounts are set.

A thirteenth embodiment will now be described. In general, an exposure control system in those image pickup apparatus called as electronic camera (digital camera) uses the so-called video AE system in which an output information of image pickup device is used to change aperture stop or shutter speed. The reason for this is that, since dynamic range of image pickup device is narrow, a small error in exposure greatly affects the image quality. For this reason, an exposure control system based on an external photometric device such as those used in silver salt cameras is hardly employed due to the fact that the external photometric device is poor in accuracy and that variances in image pickup device and external photometric device cause a reduced accuracy in exposure control.

With the video AE system, however, an accurate exposure control cannot be performed if based only on an output information of one frame due to the narrow dynamic range of image pickup device. A technique is thus used to narrow down to an optimum exposure by means of a feedback loop system by gradually changing the quantity of incident light. For this reason, several to several tens of images are required from the start of AE to the determination of an optimum value. Since, especially, the recent cameras with a larger number of pixels are becoming to require a longer time period for the outputting of one frame, there is a problem of an increased time-lag of shutter and dissipation power.

Figure 25:
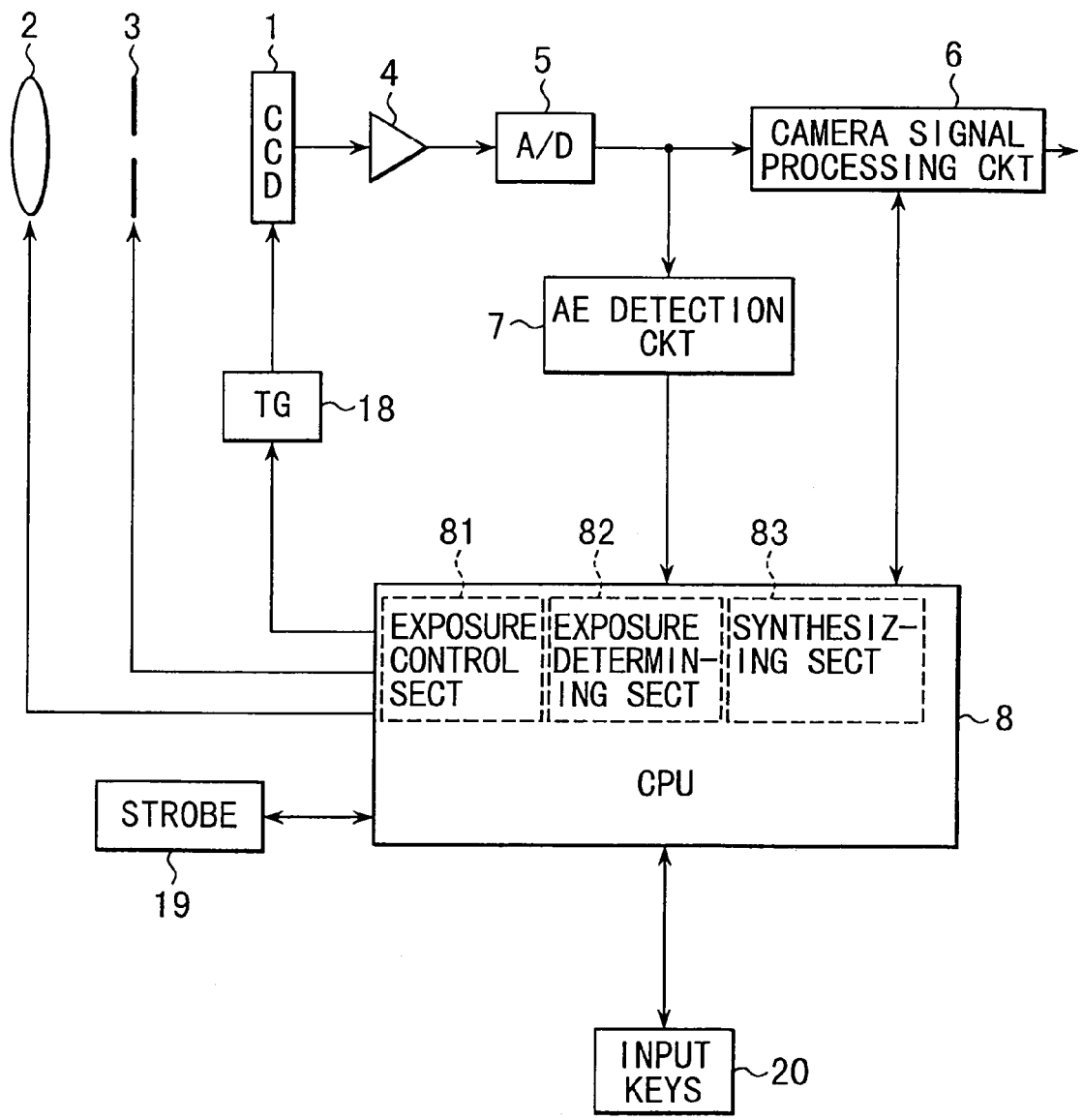
FIG. 25 is a block diagram showing an embodiment of AE apparatus for determining a suitable value of exposure on the basis of a plurality of output information of different exposure amounts.

This embodiment has been made to eliminate this problem. Its construction will be described below by way of a block diagram of FIG. 25. In this embodiment, the functions of the exposure control means, exposure determining means, synthesizing means, etc., are achieved within CPU 8. What is denoted by numeral 81 is an exposure control section, the exposure control section 81 controlling the shutter/stop mechanism 3 and the timing generator (electronic shutter) 18, thereby controlling exposure amount for the CCD image pickup device 1. Denoted by numeral 82 is a synthesizing section for synthesizing two output signals taken at different exposure amounts and outputted from the image pickup device, and 83 is an exposure determining section for determining exposure on the basis of the synthesized output signal thus synthesized.

Figure 26:
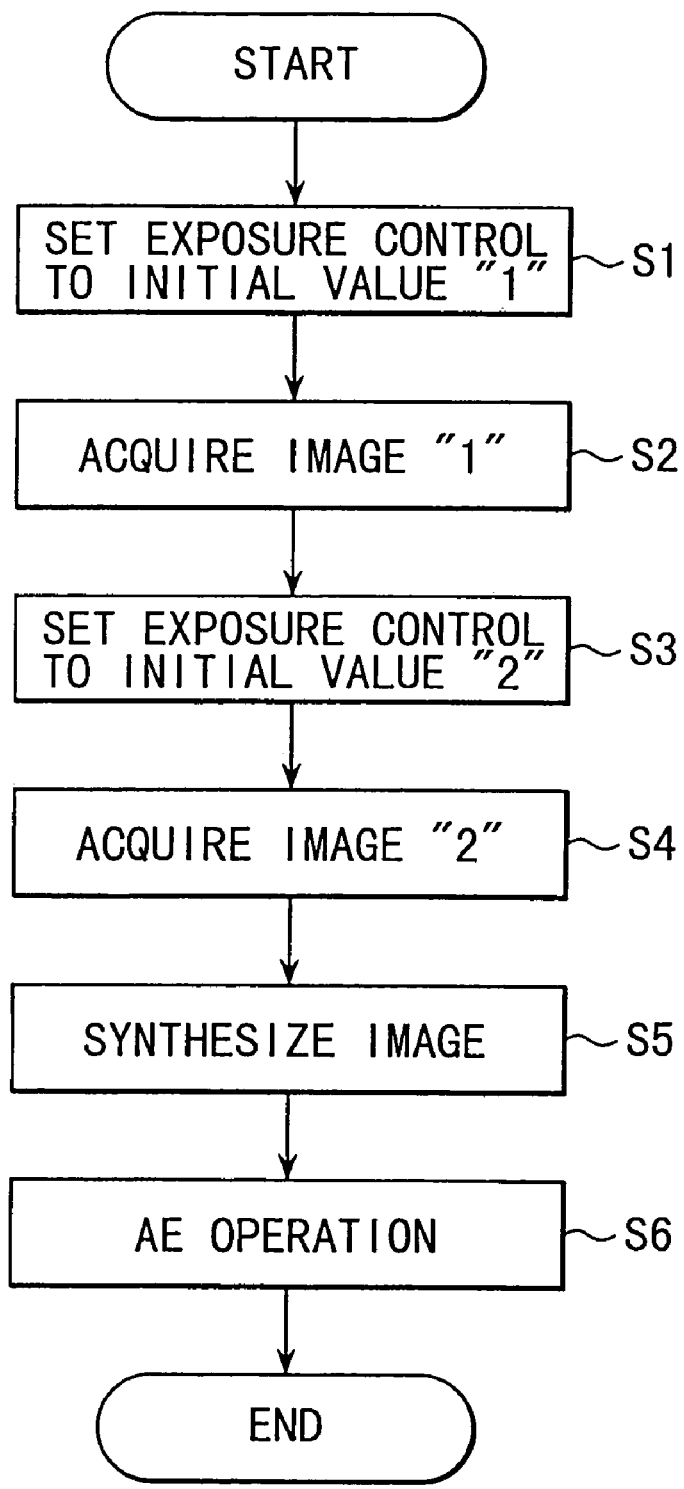
FIG. 26 is a timing chart for explaining an operation of AE apparatus shown in FIG. 25.

The operation of thus constructed AE apparatus will now be described with reference to the flowchart of FIG. 26. First, an initial value "1" is set to the exposure control section 81 and the timing generator 18 and the shutter/stop mechanism 3 are set to predetermined values corresponding to the initial value "1" (step S1). An image is then taken in the state where exposure amount is set to the initial value "1" and an image "1" is taken into CPU 8 from the CCD image pickup device 1 through the amplifier 4, analog-to-digital converter 5, and AE detection circuit 7 (step S2). The exposure control section 81 is then set to an initial value "2" which is different from the initial value "1" and the timing generator 18 and shutter/stop mechanism 3 are brought to predetermined values corresponding to the initial value "2" (step S3). An image is then taken in the state where exposure amount is set to the initial value "2" and an image "2" is taken into CPU 8 from the CCD image pickup device 1 through the amplifier 4, analog-to-digital converter 5, and AE detection circuit 7 (step S4). An image is then synthesized from the image "1" and image "2" at the synthesizing section 82 (step S5). An image information is thereby obtained as having a wide dynamic range and without lack of detail at low level portion and lack of detail at high level portion. An AE operation is then performed by using this synthesized image information (step S6). The AE operation of an optimum, suitable value thereby becomes possible by one operation, making it unnecessary to perform a feedback control.

Figure 27A:
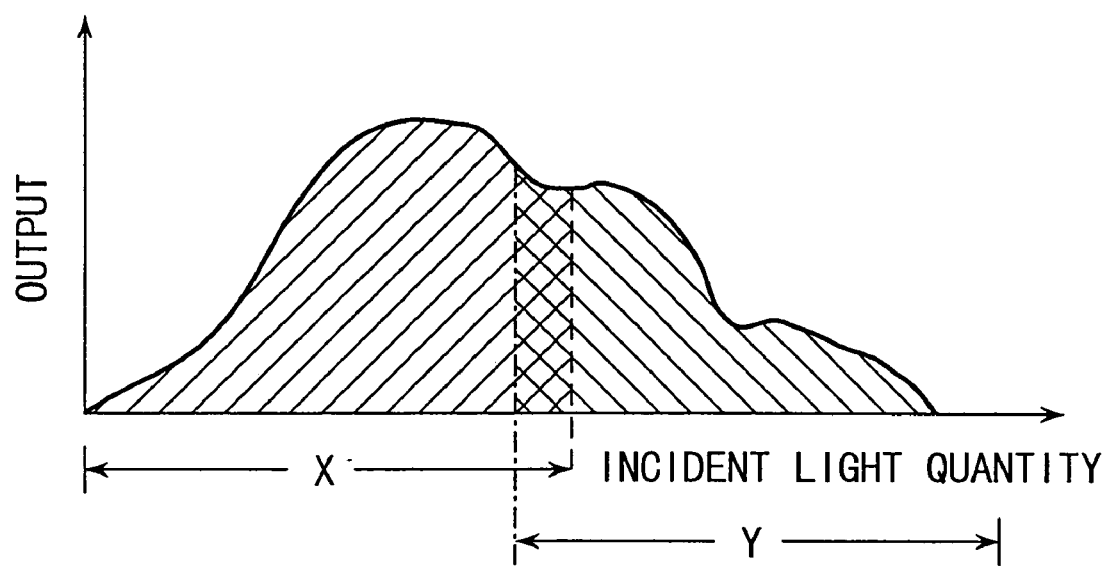
FIGS. 27A and 27B show a manner of synthesizing process of two images of different exposure amounts in order to obtain a suitable value of exposure.
Figure 27B:
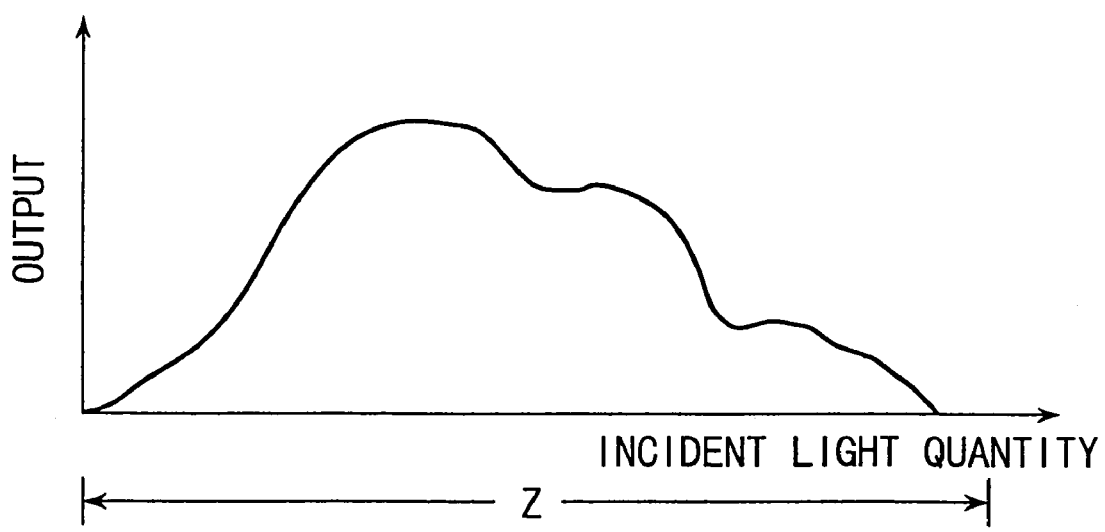

FIGS. 27A and 27B show the manner of synthesizing image "1" and image "2". Referring to FIG. 27A, "X" represents the range of incident light quantity which can be taken in when the exposure control section 81 is set to the initial value "1", image "1" of dynamic range in such incident light quantity range being taken in. "y" represents the range of incident light quantity which can be taken in when the initial value "2" is set, image 2 of dynamic range in such incident light quantity range being taken in. By synthesizing these images "1" and "2", a wide dynamic range, synthesized image as shown in FIG. 27B is obtained. "Z" represents the range of incident light quantity which has been taken in by synthesis.

With the AE apparatus according to this embodiment, if applied to an image pickup apparatus having SL function, the SL synthesizing circuit can be used also as the synthesizing section of the AE apparatus. If the AE apparatus according to the present embodiment is applied to an ordinary electronic camera, its synthesizing section can be constructed by a synthesizing circuit which is rougher than the SL synthesizing circuit.

As has been described by way of the above embodiments, in accordance with the first aspect of the present invention, operability can be improved with a single image pickup apparatus such that image is taken by selecting one taking mode from at least two modes among the normal taking mode, the forced wide dynamic range taking mode, and the automatic wide dynamic range taking mode. In accordance with the second aspect of the invention, it is possible, in the case of manually setting the generation processing of synthesized image, to make discrimination as to whether or not a previously taken image data is an image data suitable for the generation of synthesized image by the displaying of information parameter based on the previously taken image data; it is also possible by the displaying of an information obtained before the taking of image or information set before the taking of image to determine whether the generation of synthesized image based on such information is suitable. Further, in the case where the generation processing of synthesized image is automatically performed on the basis of the above described information, it is possible to confirm the information which is unsuitable to the generation of synthesized image. In accordance with the third aspect of the invention, since a determination result as to whether it is suitable for the generation processing of synthesized image is displayed, the suitability for the synthesized image generation processing can be quite readily confirmed. In accordance with the fourth aspect of the invention, since information becoming unsuitable is displayed as N.G. information, the cause of unsuitableness can be confirmed and it is thereby possible to achieve suitable conditions by changing the image taking conditions.

In accordance with the fifth aspect of the invention, since a suitable range of synthesizing process can be displayed together with a numeric parameter of information, it is possible to confirm the level of change in the image taking conditions for achieving suitableness. In accordance with the sixth aspect of the invention, since "inconsistency" is displayed when the set taking mode and the result of determination at the suitability determination means are not suitable to each other, it is possible to prevent an unsuitable taking of image resulting in a degraded picture quality, etc., from being executed. In accordance with the seventh aspect of the invention, since an exposure amount ratio of the image signals corresponding to a plurality of frames of different exposure amounts is displayed, it is possible to recognize the difference in exposure conditions of the plurality of images to be taken and the dynamic range if they are combined into a synthesized image. In accordance with the eighth aspect of the invention, since the means for displaying operation status of the correction means of exposure amount ratio is provided, confirmation can be made as to an occurrence of correction of exposure amount ratio; and at the same time, by displaying the exposure amount ratio before and after the correction, it is possible to confirm shift in the exposure amount ratio, the dynamic range based on the corrected exposure amount ratio, etc. In accordance with the ninth aspect of the invention, since the means for displaying operation status of the motion correction means is provided, an occurrence of motion can be confirmed. Further, since the fact of the occurrence of motion can be seen from an indication of "Motion Correction", the resulting degradation in image quality can be easily noticed. In accordance with the tenth aspect of the invention, since the display means for displaying ON/OFF status of the generation processing of wide dynamic range, synthesized image is provided, it is possible to readily confirm whether a synthesizing process will be actually performed or whether it has been performed.

In accordance with the eleventh aspect of the invention, since wide dynamic range, synthesized image is displayed, it is possible to confirm an actual synthesized image. In accordance with the twelfth aspect of the invention, when the taking mode and the content of information parameter are unsuitable to each other, if before the taking of image, the means for directing a change in the setting of taking mode or information parameter is provided so that image can be taken with improving image quality. Further, if after the taking of image, since a retake is directed, it is similarly possible to take image with improving image quality. In accordance with the thirteenth aspect of the invention, since the means for displaying brightness information of a desired portion of object together with an object image is provided, the displaying of luminance of the darkest portion and the brightest portion of the object for example makes it possible to recognize dynamic range and/or suitable exposure amount by numeric values. In accordance with the fourteenth aspect of the invention, since exposure amounts of the plurality of images are adjusted so that luminance information of the designated, desired regions is of suitable luminance levels at the time of generating wide dynamic range, synthesized image, it becomes possible to set wide dynamic range of the synthesized image at will by a visual method. In accordance with the fifteenth aspect of the invention, the object regions wished to be included within the dynamic range of synthesized image can be readily designated. In accordance with the sixteenth aspect of the invention, since the exposure amounts of the plurality of displayed images are set to desired exposure amounts and the dynamic range of synthesized image is set on the basis of the set exposure amounts, it becomes possible to set the dynamic range of synthesized image at will by a visual method. In accordance with the seventeenth aspect of the invention, since suitable values of exposure can be decided in a short time period on the basis of the plurality of output information of different exposure amounts, it is possible to provide an AE apparatus in which the problems of time-lag in shutter and/or dissipation power are solved.

What is claimed is:

1. An image pickup apparatus comprising: image pick up means capable of taking images of the same object at a plurality of different exposure amounts to generate image signals corresponding to a plurality of frames of different exposure amounts; means for generating wide dynamic range, synthesized image by synthesizing image signals corresponding to a plurality of frames of different exposure amounts obtained by the image pickup means; and a normal taking control means based on a normal taking mode for generating image pickup signals corresponding to one frame from said image pickup means, by one taking of image based on normal AE information; said image pickup apparatus further comprising:

at least an automatic wide dynamic range taking control means among a forced wide dynamic range taking control means based on a forced wide dynamic range taking mode for forcing a generation of wide dynamic range, synthesized image, and the automatic wide dynamic range taking control means based on an automatic wide dynamic range taking mode for automatically controlling ON/OFF of generation processing of a wide dynamic range, synthesized image by determining based at least on an information set for the image taking among object information or information set for the image taking whether it is suitable for wide dynamic range image taking or not; and means for selectively setting one image taking mode out of the taking modes respectively corresponding to these control means, wherein said information set for the image taking is a taking mode setting information among a consecutive taking mode, sports taking mode, strobe taking mode, scenery taking mode and macro-strobe taking mode, or shutter speed or zoom power.

2. The image pickup apparatus according to claim 1 further comprising a motion detecting section for detecting motion in the object to be taken, wherein said automatic wide dynamic range taking control means controls ON/OFF of the generation processing of a wide dynamic range, synthesized image based on an output of said motion detecting section.

3. The image pickup apparatus according to claim 2, wherein said motion detecting section detects motion in the object based on short-time exposure image data and long-time exposure image data.

4. The image pickup apparatus according to claim 1 further comprising a camera shake detection circuit, wherein said automatic wide dynamic range taking control means controls ON/OFF of the generation processing of a wide dynamic range, synthesized image based on an output of said camera shake detection circuit.

5. An image pickup apparatus comprising: image pickup means capable of taking images of the same object at a plurality of different exposure amounts to generate image signals corresponding to a plurality of frames of different exposure amounts; and means for generating wide dynamic range, synthesized image by synthesizing image signals corresponding to a plurality of frames of different exposure amounts obtained by the image pickup means; said image pickup apparatus further comprising:

an automatic wide dynamic range taking control means for automatically controlling ON/OFF of generation processing of a wide dynamic range, synthesized image by determining based on object information or information set for the image taking whether it is suitable for wide dynamic range image taking or not;

a motion detecting section for detecting motion in the object to be taken, wherein said automatic wide dynamic range taking control means controls ON/OFF of the generation processing of a wide dynamic range, synthesized image based on an output of said motion detecting section; and an autofocus (AF) circuit, wherein said motion detecting section detects motion in the object based on AF signal from said AF circuit.

* * * * *